United States Patent [19]
Tajiri et al.

[11] Patent Number: 5,490,572
[45] Date of Patent: Feb. 13, 1996

[54] BATTERY TEMPERATURE CONTROL SYSTEM IN ELECTRIC AUTOMOBILE

[75] Inventors: Akihiro Tajiri; Yoshihiko Hotta; Mitsuru Ishikawa; Choji Sakuma; Nobuyuki Yuri, all of Saitama, Japan

[73] Assignee: Honda Giken Kogyo Kabushiki Kaisha, Tokyo, Japan

[21] Appl. No.: 986,124

[22] Filed: Dec. 4, 1992

[30] Foreign Application Priority Data

Dec. 4, 1991 [JP] Japan ................................. 3-347727

[51] Int. Cl.⁶ ................................................. B62D 25/00
[52] U.S. Cl. ........................ 180/65.1; 180/68.5; 180/68.2
[58] Field of Search ................................. 180/68.3, 65.1, 180/68.1, 68.2, 68.5

[56] References Cited

U.S. PATENT DOCUMENTS

| | | | |
|---|---|---|---|
| 1,887,224 | 11/1932 | Ward et al. | 62/236 |
| 2,077,974 | 4/1937 | Wishast | 165/42 |
| 2,104,768 | 1/1938 | Saunders | 180/68.5 |
| 2,104,773 | 1/1938 | Saunders | 180/68.5 |
| 2,264,848 | 12/1941 | Kahl | 62/324.1 |
| 2,806,358 | 9/1957 | Jacobs | 165/43 |
| 3,173,275 | 3/1965 | Urian | 62/236 |
| 3,595,029 | 7/1971 | Lende, Jr. | 62/244 |
| 3,731,729 | 5/1973 | Beatenbough et al. | 165/16 |
| 3,973,620 | 8/1976 | Stringer | 165/42 |
| 4,098,093 | 7/1978 | Czyl | 62/243 |
| 4,135,593 | 1/1979 | Fowkes | 280/65.1 |
| 4,274,265 | 6/1981 | Okumura | 62/244 |
| 4,307,575 | 12/1981 | Popinski | 62/148 |
| 4,436,064 | 3/1984 | Lamkewitz | 123/142.5 |
| 4,641,502 | 2/1987 | Aldrich et al. | 62/244 |
| 4,881,496 | 11/1989 | Yasuda et al. | 454/75 |
| 5,031,712 | 7/1991 | Karolek et al. | 180/68.2 |
| 5,082,075 | 1/1992 | Karolek et al. | 180/68.2 |
| 5,172,559 | 12/1992 | Renken et al. | 62/160 |
| 5,320,190 | 6/1994 | Xlaumann et al. | 180/68.5 |

FOREIGN PATENT DOCUMENTS

| | | | |
|---|---|---|---|
| 55-8588 | 1/1980 | Japan . | |
| 56-82627 | 7/1981 | Japan | 62/121 |
| 60-179322 | 9/1985 | Japan . | |
| 62-110518 | 5/1987 | Japan | 454/75 |
| 0285778 | 11/1989 | Japan | 62/236 |
| 2-304343 | 12/1990 | Japan . | |
| 3-42325 | 2/1991 | Japan . | |
| 3-36180 | 5/1991 | Japan . | |

Primary Examiner—Richard M. Camby
Attorney, Agent, or Firm—Lyon & Lyon

[57] ABSTRACT

A battery temperature control system in an electric automobile which is equipped with an air conditioner for supplying a cool or warm air into a passenger compartment and which travels by using batteries as a power source accommodated in a battery chamber. The system includes a battery temperature sensor for detecting a temperature of the battery, a control unit adapted to drive the air conditioner in an air-cooling mode when the battery temperature detected by the temperature sensor is higher than a predetermined upper limit, and in an air-heating mode when the battery temperature detected by the temperature sensor is lower than a predetermined lower limit. An air intake port is provided in the battery chamber for introducing an air supplied from the air conditioner into the battery chamber. Further, in order to obtain a sufficiently warm air even when the atmospheric temperature is low, an auxiliary heat exchanger 28 which is heated by the combustion heater 29 also is provided.

25 Claims, 12 Drawing Sheets

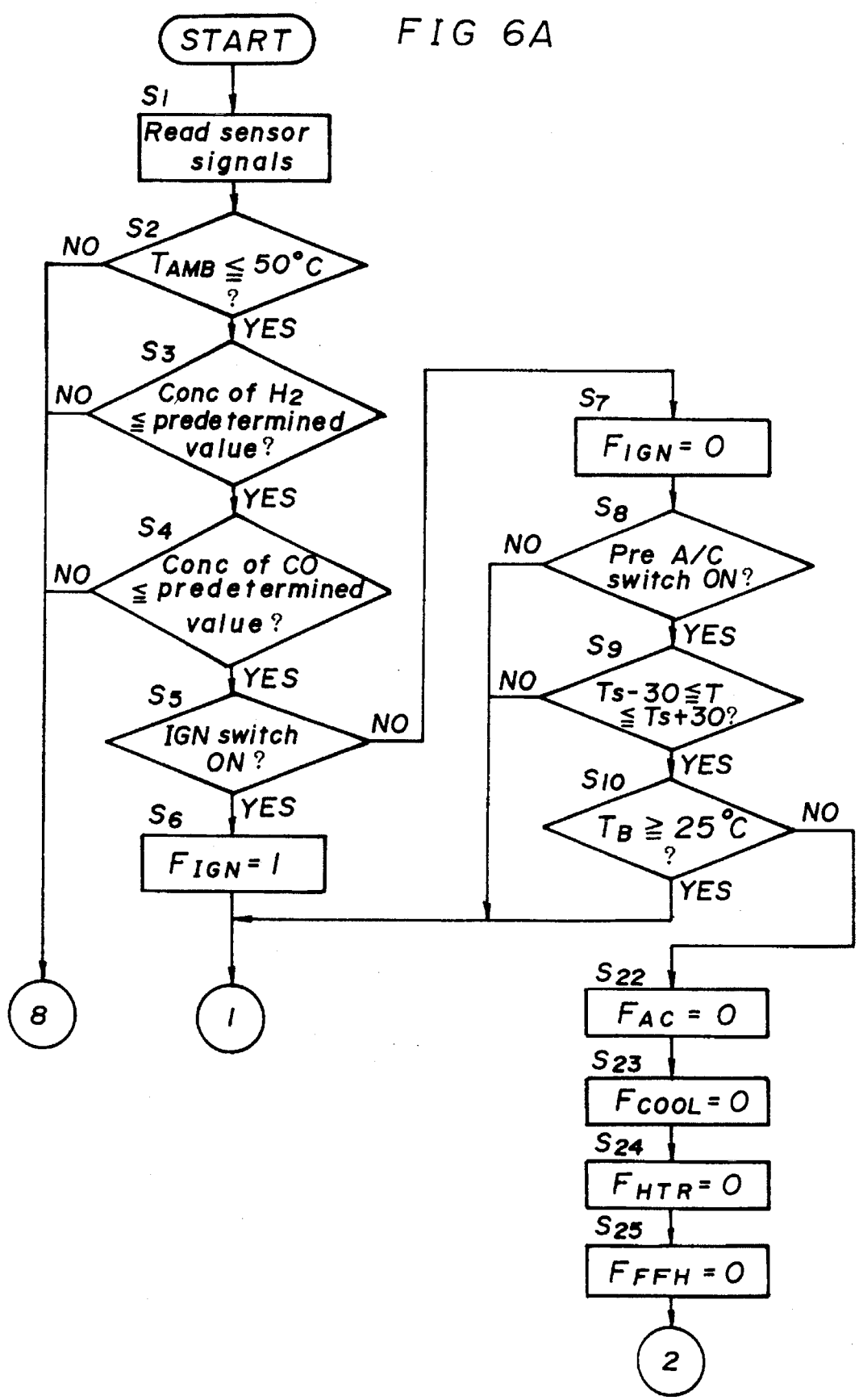

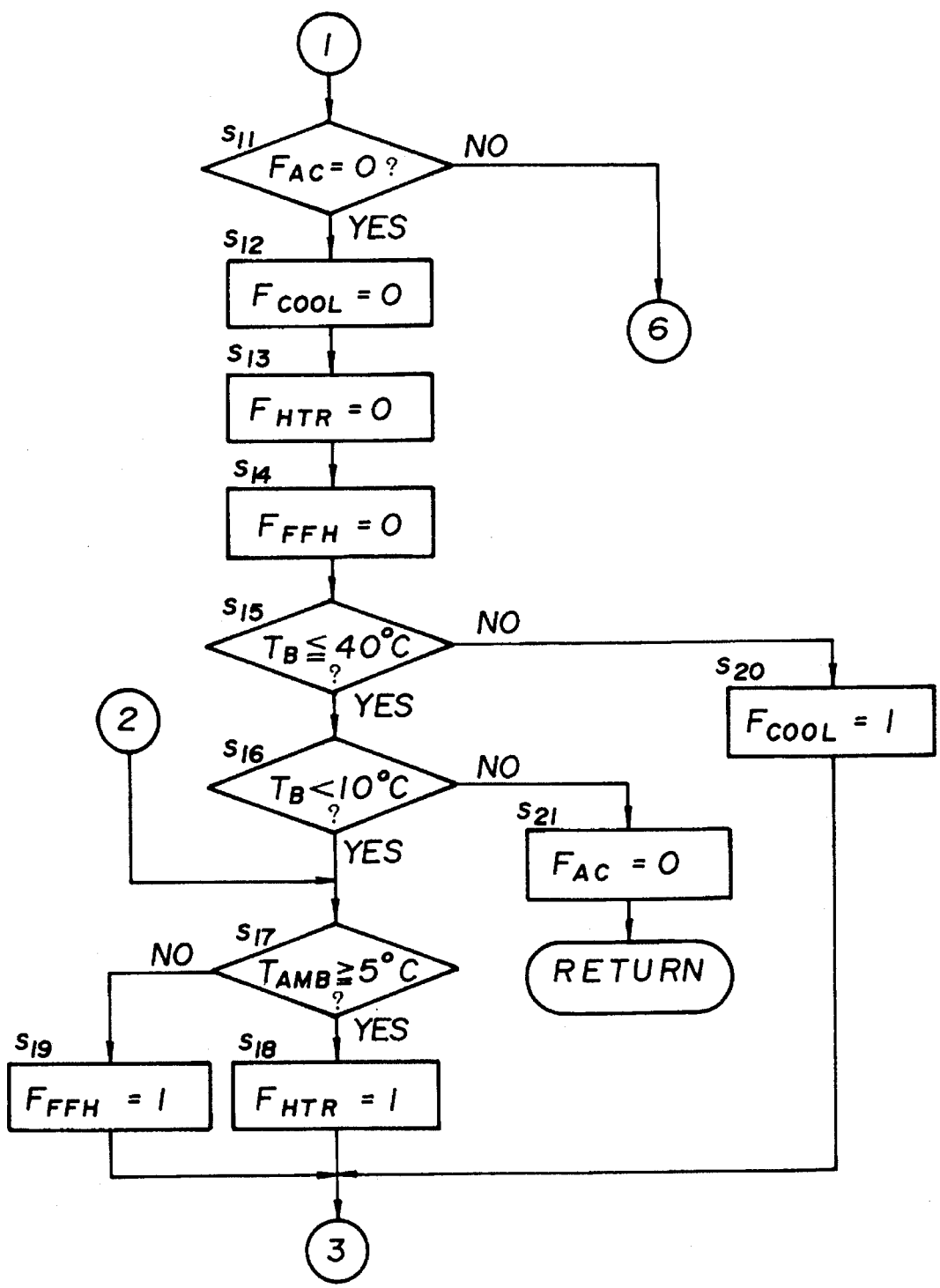

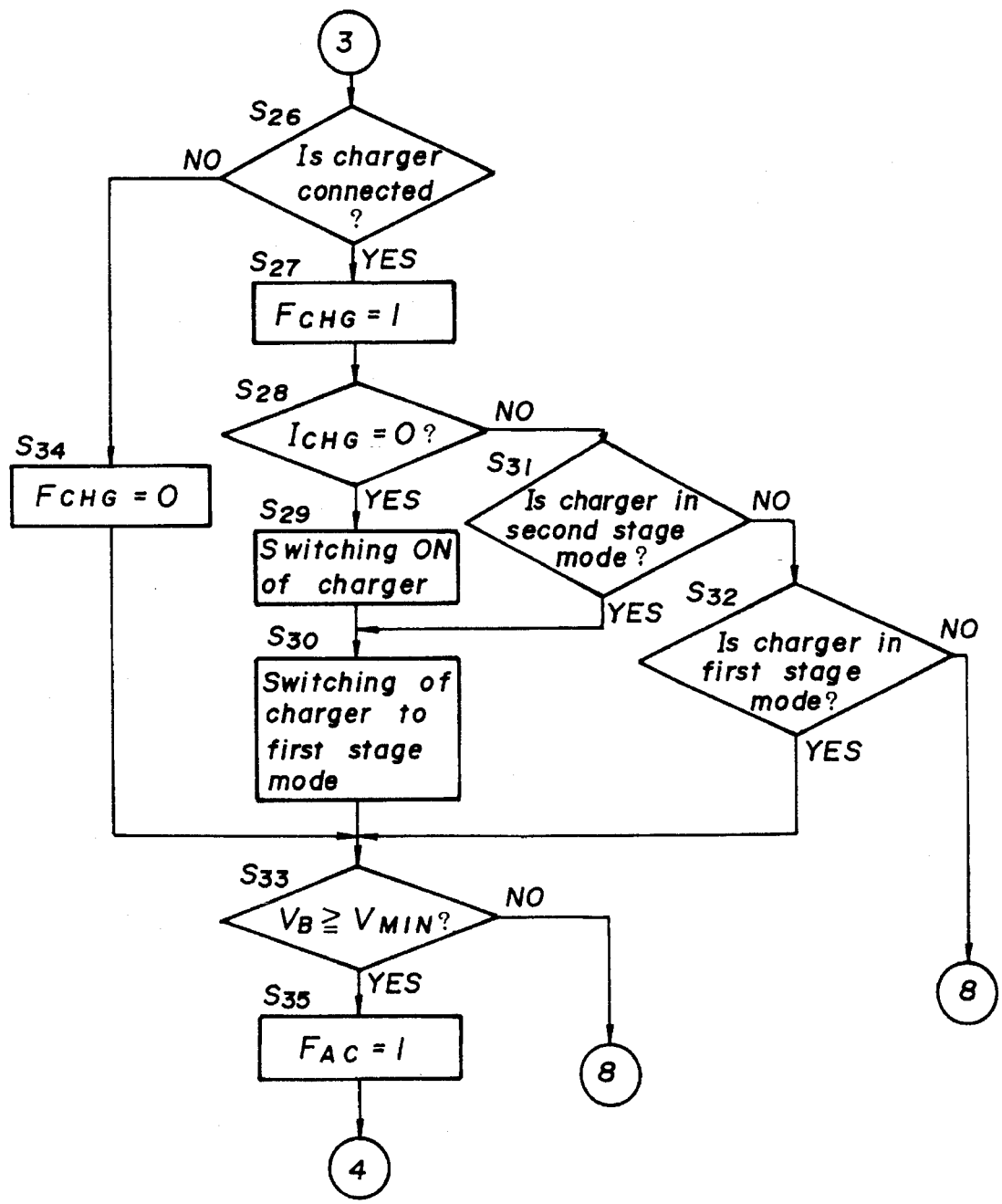

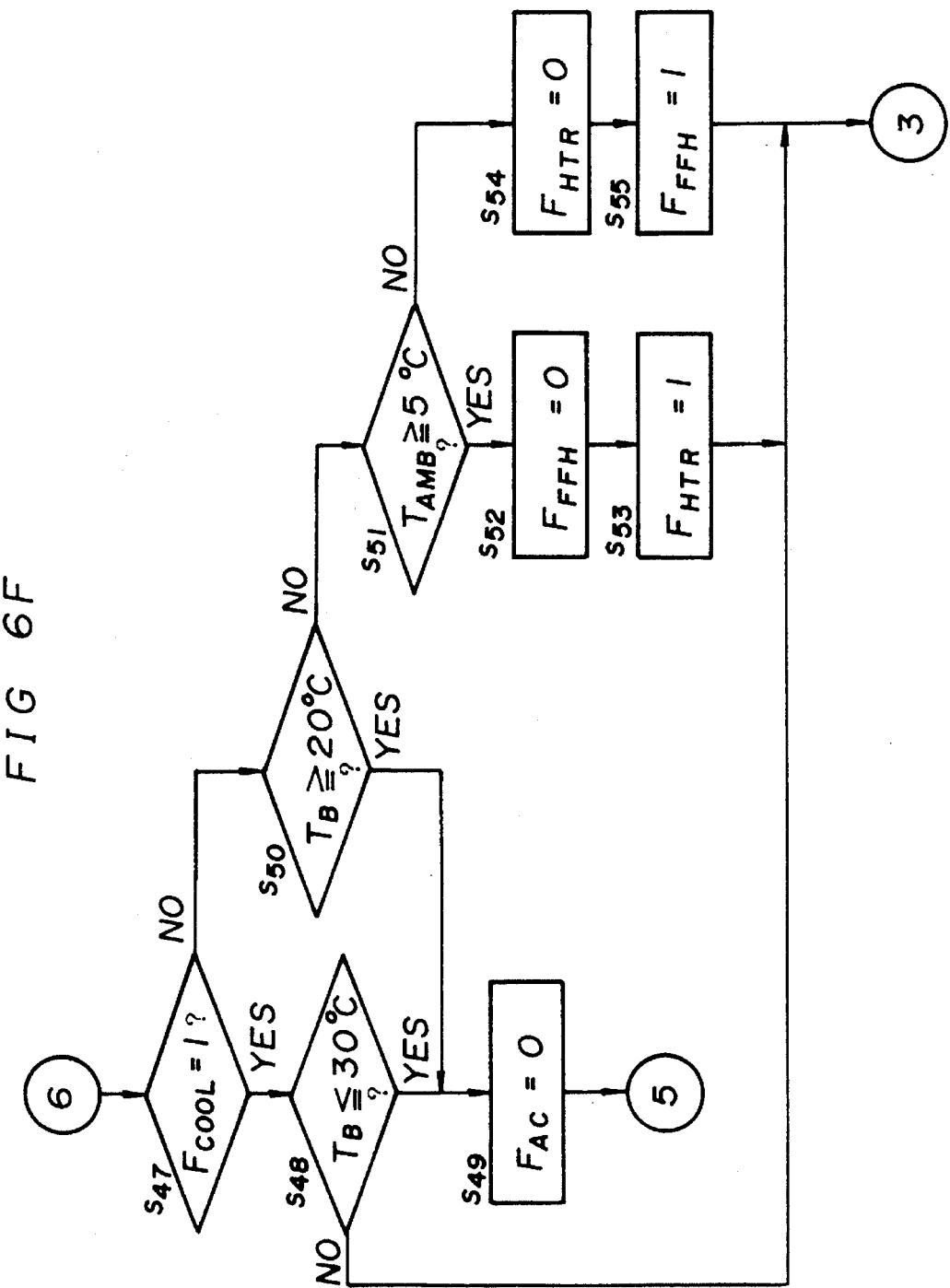

BATTERY TEMPERATURE CONTROL SYSTEM IN ELECTRIC AUTOMOBILE

BACKGROUND OF THE INVENTION

1. Field of the Invention

The present invention relates to a battery temperature control system in an electric automobile using a battery mounted therein as a power source, and particularly, to a battery temperature control system in an electric automobile equipped with an air-cooling and/or heating device for supplying air, which is conditioned in temperature, into a passenger compartment.

2. Description of the Prior Art

In an electric automobile, the charging of the battery is conducted when the automobile is not in use such as at night. During such charging, the battery generates heat. The battery also generates heat when it is used for driving the automobile, i.e., even during discharging. Moreover, the battery is usually accommodated in a battery chamber which is closed. For this reason, the battery may develop a considerably high temperature in some cases.

However, in such a battery used in the electric automobile, if the temperature of the battery rises above a certain temperature, e.g., 50° C. or more, not only the performance of the battery but also its life-time is significantly reduced. Therefore, it is necessary to cool the battery.

Thus, it has been proposed that outside air be introduced into the battery chamber to cool the battery, as disclosed, for example, in U.S. Pat. No. 4,135,593.

However, with this system in which the battery is cooled by the outside air in the above manner, a sufficient cooling effect can not be obtained if the air temperature is high. Particularly, when a high load is applied for a long time, as is the case when the automobile travels on a long upward slope, or when a rapid charging is conducted at a charging station, the battery reaches an extremely high temperature. Therefore, the battery can not be sufficiently cooled by the outside air. As a result, the rate of discharging must be reduced, such as by slowing the vehicle, or the charging must be discontinued until the temperature of the battery declines, or the charging current must be lowered, resulting in a problem that it takes a long time to charge.

In contrast, when the temperature of the battery is lower than a predetermined temperature, the charging efficiency is low and the output of the battery is also low. When the electric automobile is used, for example, in a cold region, the temperature of the battery may not rise in some cases to a predetermined temperature during charging of thereof. In such a case, the above described prior art system in which the battery is cooled by the outside air, it is impossible to increase the temperature of the battery.

For the above-described reasons, it is necessary to maintain the temperature of the battery within a predetermined range. Particularly, in the case of a nickel-cadmium based battery having a high performance, a precise control of temperature is required.

SUMMARY OF THE INVENTION

The present invention has been accomplished with such circumstances in view, and it is an object of the present invention to provide a battery temperature control system which is capable of controlling the temperature of a battery within a predetermined range, irrespective of the outside air temperature.

Usually, the passenger compartment of an electric automobile is provided with at least an air-cooling device when the automobile is used in a hot region where air temperature is high, and with at least an air-heating device when the automobile is used in a cold region. Thus, to achieve the above object, according to the present invention, the battery temperature is controlled by utilizing the air-cooling device or the air-heating device.

More specifically, in an electric automobile equipped with the air-cooling device, a battery temperature control system according to the present invention comprises a battery temperature sensor for detecting the temperature of the batteries, a control unit adapted to drive the air-cooling device, when the battery temperature detected by the temperature sensor is higher than a predetermined temperature, and a temperature-conditioned air intake port provided in the battery chamber for introducing the cool air supplied from the air-cooling device into the battery chamber.

In an electric automobile equipped with an air-heating device, a battery temperature control system according to the present invention comprises a battery temperature sensor for detecting the temperature of the batteries, a control unit adapted to drive the air-heating device, when the battery temperature detected by the temperature sensor is lower than a predetermined temperature, and a temperature-conditioned air intake port provided in the battery chamber for introducing the heated air supplied from the air-heating device into the battery chamber.

When an electric automobile is equipped with an air conditioner serving as both the air-cooling and the air-heating devices, the control unit is designed to drive the air conditioner in an air-cooling mode, when the battery temperature is higher than a predetermined upper limit and in an air-heating mode, when the battery temperature is lower than a predetermined lower limit.

Further, the control unit is designed to generate a signal indicative of a command to control the charger for charging the battery. During charging, the charging electric power from the charger is increased, when the air conditioner is driven.

With the above-described arrangement of the battery temperature control system, when the battery is charged, for example, in summer, the air-cooling device or the air conditioner mounted in the automobile is driven to supply cool air, if the battery temperature rises higher than the predetermined temperature. Thus, the cool air is supplied to the battery chamber to cool the battery. More specifically, when the temperature of the battery as the drive source for the electric automobile is high, the air-cooling device or the air conditioner mounted in the automobile is driven, so that the cool air supplied from the air-cooling device or the air conditioner is introduced into the battery chamber. Therefore, the battery can be reliably cooled irrespective of the air temperature. This prevents an excessive increase in the temperature of the battery, thereby preventing reductions in the performance and the life-time of the battery due to the increase in the temperature. In this manner, the increase in the temperature of the battery is prevented during charging of the battery and therefore, even if the outside air temperature is high, it is possible to charge the battery rapidly.

When the battery temperature is lower than a predetermined temperature in a cold season, such as in winter, warm air is supplied from the air-heating device or the air conditioner to heat the battery. Therefore, the temperature of the battery is maintained within an acceptable range. That is, if the battery temperature is low at the start of charging or operation of the vehicle in a cold season, the temperature can be increased by introducing the warm air supplied from the air-heating device or the air conditioner into the battery chamber. Therefore, it is possible to prevent a reduction in battery output and charging efficiency due to the low temperature.

When the air conditioner is driven in the above manner, the electric charging power from the charger is increased if the air conditioner is in a battery charging state. Therefore, the air conditioner is driven by the electric power from the charger, and the electric power of the battery itself is not consumed in order to control the temperature of the battery which is being charged.

The above and other objects, features and advantages of the invention will become apparent from the following description of the preferred embodiment, taken in conjunction with the accompanying drawings.

BRIEF DESCRIPTION OF THE DRAWINGS

FIG. 6A is a first flow chart illustrating the operation of the control unit;

FIG. 6B is a second flow chart illustrating the operation of the control unit;

FIG. 6C is a third flow chart illustrating the operation of the control unit;

FIG. 6F is sixth flow chart illustrating the operation of the control unit; and

DESCRIPTION OF THE PREFERRED EMBODIMENT

The present invention will now be described by way of a preferred embodiment in connection with the accompanying drawings.

Figure 1:
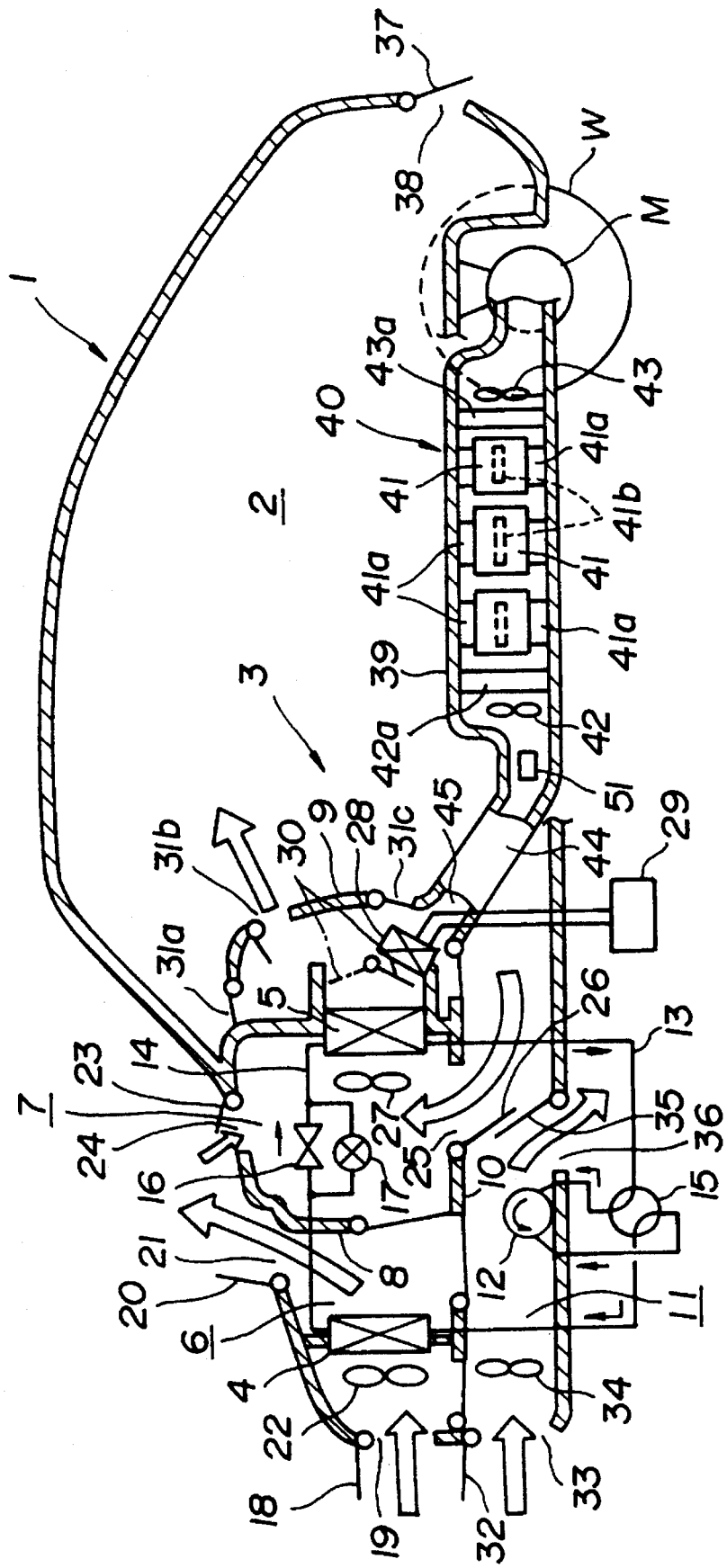
FIG. 1 illustrates a preferred embodiment of a battery temperature control system and is a diagrammatic longitudinal sectional elevation view of an electric automobile equipped with the temperature control system.
Figure 2:
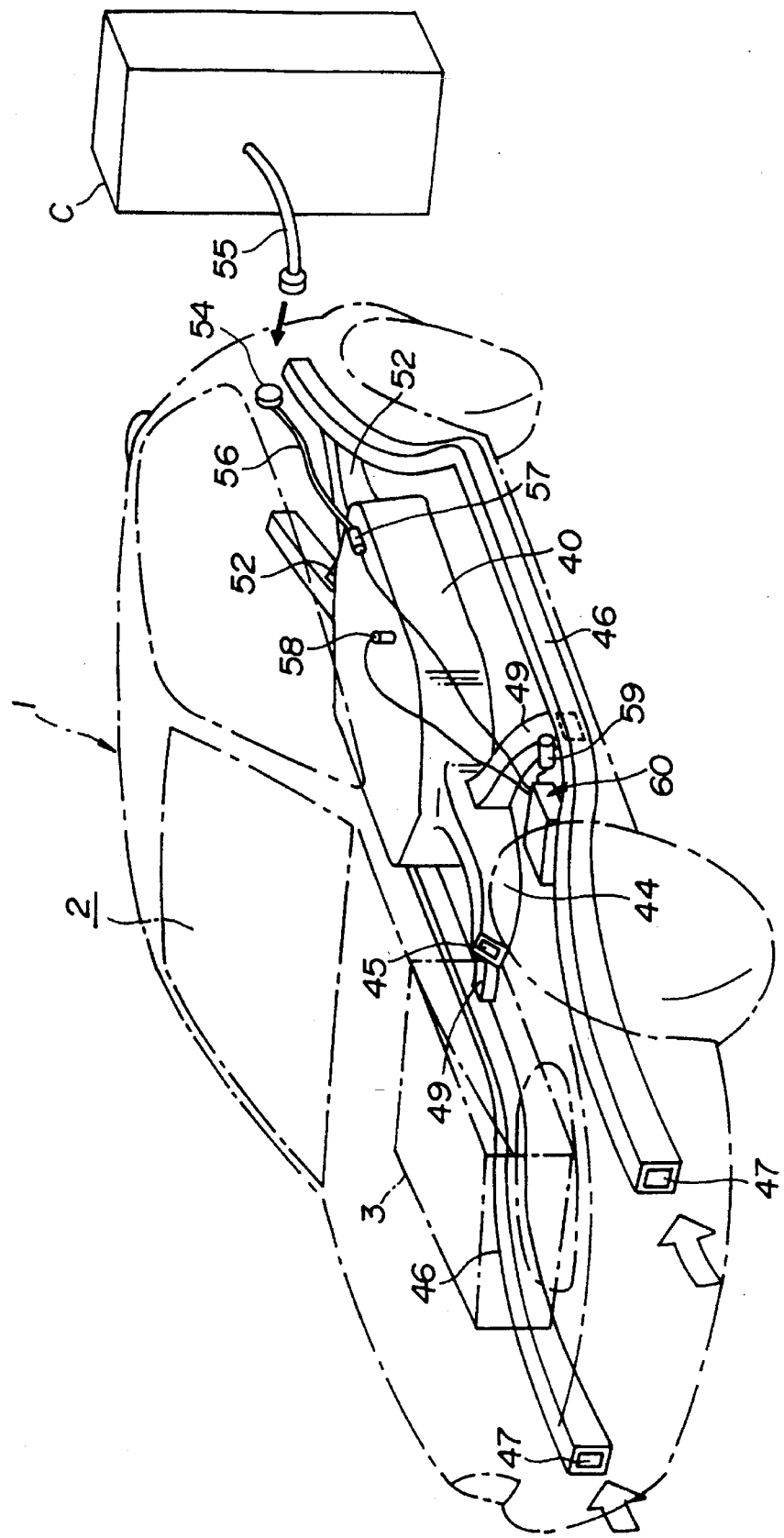
FIG. 2 is a perspective view illustrating the structure of a lower portion of the electric automobile.
Figure 3:
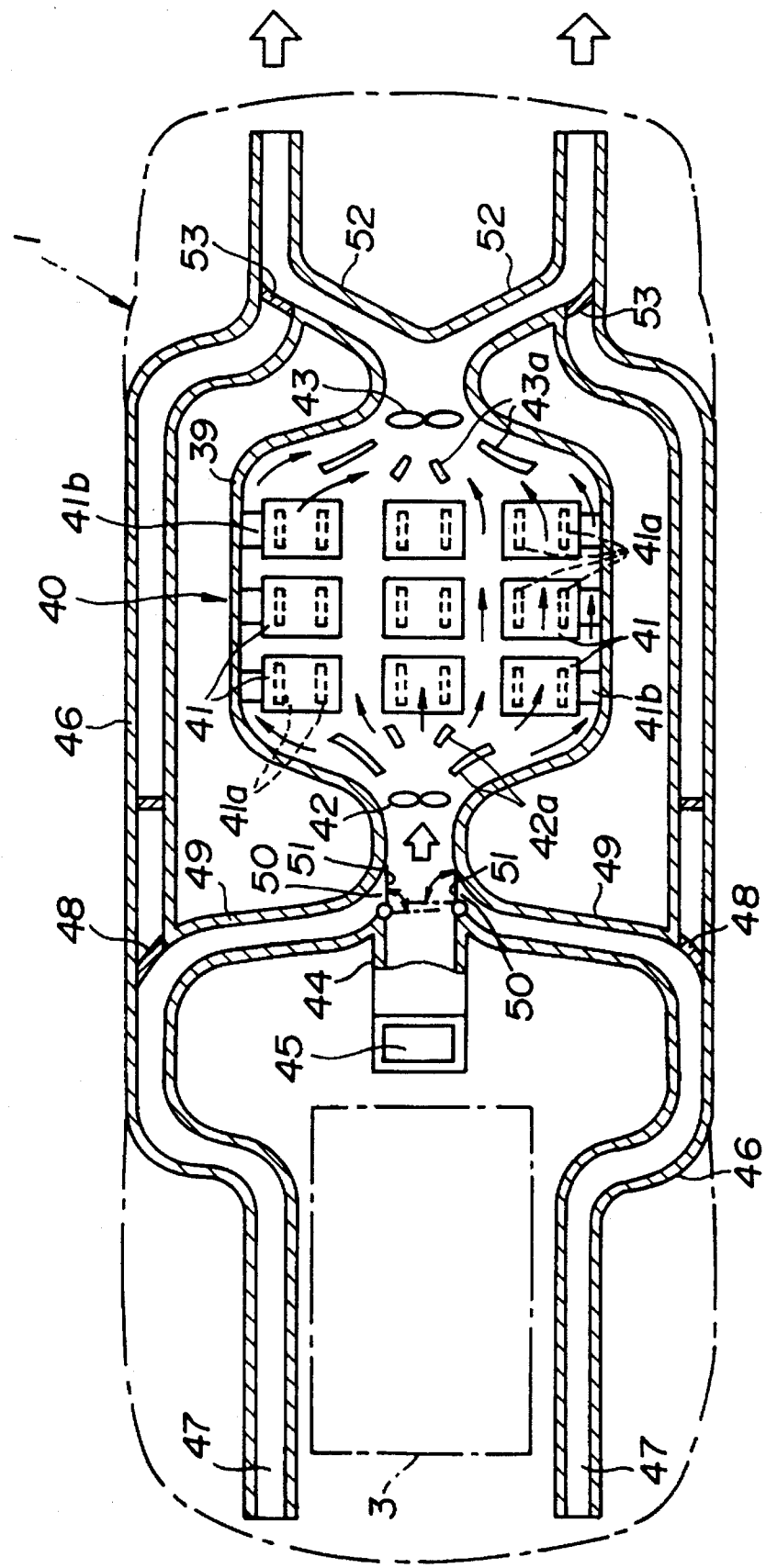
FIG. 3 is a diagrammatic sectional plan view illustrating the structure of a lower portion of the electric automobile.

The drawings illustrate a preferred embodiment of a battery temperature control system according to the present invention, wherein FIG. 1 is a diagrammatic longitudinal sectional elevation view of an electric automobile equipped with the battery temperature control system, and FIGS. 2 and 3 are sectional perspective and plan views of the electric automobile, respectively.

As can be seen from FIG. 1, the automobile 1 is an electric automobile and a travelling motor M for driving the rear wheels W is placed at a lower portion of the rear portion of the vehicle body. The electric automobile 1 is provided with a heat pump type air conditioner 3 in front of a passenger compartment 2. The air conditioner 3 comprises an exterior heat exchanger U for heat exchange with air introduced from outside of the vehicle and an interior heat exchanger 5 for heat exchange with air supplied into the compartment 2. The exterior heat exchanger 4 is disposed within a first heat exchanger chamber 6 provided in a forefront portion of the vehicle body. The interior heat exchanger 5 is disposed in a second heat exchanger chamber 7 which is provided adjacent and to the rear of the first heat exchanger chamber 6. The first heat exchanger chamber 6 and the second heat exchanger chamber 7 are partitioned from each other by a vertical partition wall 8. The second heat exchanger chamber 7 and the compartment 2 are partitioned from each other by an instrument panel 9. Further, a compressor chamber 11 is defined below the first and second heat exchanger chambers 6 and 7 by a horizontal partition wall 10. A compressor 12 and a motor (not shown) for driving the compressor 12 are disposed in the compressor chamber 11.

The exterior and interior heat exchangers 4 and 5 are connected to each other by two refrigerant pipes 13 and 14, so that a refrigerant is circulated through these heat exchangers 4 and 5. The compressor 12 is connected to the refrigerant pipe 13 through a four-way valve 15. Thus, the refrigerant compressed by the compressor 12 can be introduced toward either the exterior heat exchanger 4 or the interior heat exchanger 5 by switching the four-way valve 15. The other refrigerant pipe 14 has an expansion valve 16 for depressurizing the refrigerant. The expansion valve 16 is of a reversible type. The refrigerant flowing in either direction through the refrigerant pipe 14 is depressurized by the expansion valve 16. Further, a bypass valve 17 is connected to the refrigerant pipe 14 to bypass the expansion valve 16.

An outside-air introduction port 19 is provided in a front surface of the first heat exchanger chamber 6 and is opened and closed by an outside-air introduction damper 18. An air discharge port 21 is also provided in a top surface of the heat exchanger chamber 6 at its rear portion and is opened and closed by a discharge damper 20. An exterior electric fan 22 is disposed in front of the exterior heat exchanger 4 within the heat exchanger chamber 6. Thus, the air outside the vehicle is taken through the outside-air introduction port 19 into the first heat exchanger chamber 6 by the electric fan 22 and then, the air is blown through the exterior heat exchanger 4 and is discharged through the air discharge port 21 to the outside of the vehicle.

An outside-air intake port 24 is also provided in a top surface of the second heat exchanger chamber 7 at its front portion. The port 24 is opened and closed by an outside-air introduction damper 23. The horizontal partition wall 10 forms a bottom surface of the heat exchanger chamber 7 and is provided, at a position in front of the interior heat exchanger 5, with an inside-air introduction port 25 for taking the air in the compartment 2 into the heat exchanger chamber 7. The inside-air introduction port 25 is opened and closed by an inside-air circulating damper 26 which is pivoted downwardly. When the inside-air introduction port 25 is opened, the com-partment 2 and the compressor chamber 11 are isolated from each other by the inside-air circulating damper 26. Further, an interior electric fan 27 is disposed in the second heat exchanger chamber 7 in front of the interior heat exchanger 5.

An auxiliary heating heat exchanger 28 is placed rearwardly of the interior heat exchanger 5 for heating the air passed through the interior heat exchanger 5, if required. A high temperature water or other liquid is supplied from a combustion type heater 29 as an auxiliary heater which is operated when the temperature of the open air is very low. An air mixing damper 30 is mounted on the side of a front surface of the auxiliary heating heat exchanger 28 and normally is retained in a position shown by the solid line in FIG. 1 to cover the front surface of the heat exchanger 28. When the auxiliary heating heat exchanger 28 is operated, the damper 30 is pivoted to an arbitrary position, such as shown by the phantom line in FIG. 1, to open the front surface of the auxiliary heating heat exchanger 28 as needed.

Air discharge ports 31a, 31b, 31c are provided in a top surface and upper and lower portions, respectively, of the instrument panel 9 between the second heat exchanger chamber 7 and the compartment 2, as in gasoline-type automobiles. These air discharge ports 31a, 31b, 31c can also be selectively opened and closed.

In the above-described structure, the air from outside the vehicle or air in the compartment 2 is drawn into the second heat exchanger chamber 7 through the outside-air intake port 24 or the inside-air introduction port 25, respectively, and is blown through the interior heat exchanger 5 in heat-exchange relationship with the refrigerant by the heat exchanger 5. The air is further heated by the auxiliary heating heat exchanger 28, if required, and then introduced through one or more of the air discharge ports 31a, 31b and 31c into the compartment 2.

The compressor chamber 11 is provided at its front surface with a cooling-air intake port 33 which is opened and closed by an outside-air introducing damper 32. An electric fan 33 is provided just to the rear of the air intake port 33 for drawing the air into the compressor chamber 11. A heat discharge port 36 is provided at a position to the rear of the compressor 12 in the compressor chamber 11 and is opened and closed by an upwardly-pivotable heat discharge damper 35. Thus, the compressor 12 and the drive motor therefor placed in the compressor chamber 11 may be cooled by the outside air which is taken through the air intake port 33 in the front surface into the compressor chamber, and the air heated by such cooling is discharged through the heat discharge port 36 to the outside of the vehicle.

Further, the compartment 2 is provided at its rear surface with a ventilation port 38 which is opened and closed by a ventilation damper 37.

In an electric automobile equipped with the above described air conditioner 3, for providing cooled air the four-way valve 15 is shifted so as to permit the refrigerant supplied from the compressor 12 to flow toward the exterior heat exchanger 4. The outside-air introduction port 19 and the air discharge port 21 in the first heat exchanger chamber 6, the inside-air introduction port 25 in the second heat exchanger chamber 7, the air discharge port 31b in the upper portion of the instrument panel 9 and the cooling-air intake port 33 and the heat discharge port 36 in the compressor chamber 11 are opened. Then, the compressor 12 and the electric fans 22, 27 and 34 are driven. By doing so, the refrigerant compressed by the compressor 12 to a high temperature and a high pressure is first introduced to the exterior heat exchanger 4. The outside air drawn from the outside of the vehicle is blown through the exterior heat exchanger 4 by fan 22. Thus, the refrigerant is cooled by heat exchange with the out-side air. Subsequently, the refrigerant is depressurized by the expansion valve 16 in pipe 14 and then passes into the interior heat exchanger 5, where the refrigerant is rapidly expanded and vaporized. During this time, the refrigerant absorbs heat from its surroundings. Thus, the air introduced from the compartment 2 and blown through the interior heat exchanger 5 by fan 27 is cooled. Then, the cooled air is supplied through the air discharge port 316 into the compartment 2. In this manner, the compartment 2 is cooled. In this case, if the outside-air intake port 24 in the second heat exchanger chamber 7 and the ventilation port 38 in the rear surface of the compartment 2 are opened, the compartment 2 can also be ventilated with fresh air. The compressor 12 is cooled by the outside air passing through the compressor chamber 11.

If the four-way valve 15 is switched so as to permit the refrigerant compressed by the compressor 12 to flow toward the interior heat exchanger 5, the heat pump cycle is inverted from the air-cooling operation, and the air which is blown through the interior heat exchanger 5 is heated. Further, the air discharge port 31c in the lower portion of the instrument panel 9 is opened and the warm air is supplied through the air discharge port 31c into the compartment 2, so that the compartment 2 is heated.

When the heating is performed in this manner by the heat pump cycle, the heat therefor is absorbed from the outside air and hence, when the outside air is at a very low temperature, e.g., 5° C. or less, a sufficient heating may not be performed. In such an event, the air mixing damper 30 is pivoted to the position shown by the phantom line in FIG. 1 to open the front surface of the auxiliary heating heat exchanger 28, and the combustion heater 29 is operated. Then, the air passed through the interior heat exchanger 5 is blown through and heated by the auxiliary heating heat exchanger 28 and then introduced into the compartment 2. Therefore, the interior of the compartment 2 is heated sufficiently. In this case, the heat pump cycle may be also used, but a sufficient heat may be provided by only the combustion heater 29. Therefore, the compressor 12 and the electric fans 24 and 34 for the heat pump cycle are usually stopped for the purpose of preventing the consumption of electric power. However, only the interior electric fan 27 is driven.

In this manner, the compartment 2 is cooled or heated by means of the air conditioner 3.

In this automobile 1, a battery chamber 40 is provided below the lower and rear portion of the compartment 2 and surrounded by a surrounding wall 39. A plurality of batteries 41, 41 - - - , as power sources for the automobile 1, are accommodated in the battery chamber 40. As is shown in FIGS. 1 and 3, the batteries 41, 41 - - - are supported by longitudinally extending projections 41a protruding from the horizontal top and bottom surrounding wall portions 39 of the battery chamber 40 and longitudinally extending projections 41b protruding from the vertical side wall portions 39. Air passages are defined between the batteries and between the batteries and the surrounding wall 39. Front and rear electric fans 42 and 43 are mounted in the front and rear of the batteries 41, 41 - - - in the battery chamber 40, respectively. Baffle plates 42a are mounted to the rear of the front electric fan 42, so that the air drawn by the electric fan 42 is introduced around each of the batteries 41, 41 - - - in the battery chamber 40. Baffle plates 43a are mounted in front of the rear electric fan 43, so that the air flowing between the batteries 41, 41 - - - is drawn by the rear electric fan 43.

An air duct 44 is provided at a central portion of a front surface of the battery chamber 40. The front end of the air duct 44 serves as a temperature-conditioned air intake port 45 and is connected to the central portion of the lower end of the instrument panel 9. Thus, the air passed through the interior heat exchanger 5 in the air conditioner 3 and sometimes through the auxiliary heating heat exchanger 28 is passed through the air duct 44 into the battery chamber 40.

As is shown in FIGS. 2 and 3, longitudinally extending side frames 46, 46 are mounted in the automobile 1 on laterally opposite sides of a lower surface of the vehicle body. Each side frame is hollow and its front and rear ends are open. Therefore, the outside air can flow through an opening 47 at the front end into each side frame 46. Each side frame 46 is partitioned at a location forward of its central portion by a partition plate 48. On each side a suction duct 49 is connected at one end to the side frame 46 in front of the partition plate 48.

The air duct 44 in the battery chamber 40 has outside-air intake ports 50, 50 provided in laterally opposite sides of an intermediate portion thereof. The other ends of the left and right suction ducts 49, 49 are connected to the outside-air intake ports 50, 50, respectively. The outside-air intake port 50 is opened and closed by an inwardly and outwardly pivotable damper 51. Moreover, as is shown by a phantom line in FIG. 3, when the outside-air intake port 50 is opened, the front end of the air duct 44, i.e., the temperature-conditioned air intake port 45 for receiving the air supplied from the air conditioner 3 is closed by the dampers 51. In this way, the temperature-conditioned air intake port 45 and the outside-air intake ports 50 in the battery chamber 40 can be switched over. When the outside-air intake ports 50 are opened, the outside-air drawn from the openings 47 at the front end of each of the side frames 46 is introduced through the outside-air intake ports 50 into the battery chamber 40. The damper 51 is usually retained at a position shown by the phantom line in FIG. 3, and driven and pivoted to a position shown by the solid line to open the temperature-conditioned air intake port 45, i.e., the side for receiving the temperature-conditioned air from the air conditioner 3. The electric fans 42 and 43 are driven in operative association with the damper 51.

Forked discharge ducts 52, 52 are connected to a rear surface of the battery chamber 40. The other ends of the discharge ducts 52, 52 are connected to the rear portions of the side frames 46, 46, respectively. Each side frame 46 is provided with a partition plate 53 at a location forward of the connection of the discharge duct 52. Thus, the air in the battery chamber 40 is discharged rearwardly of the vehicle body through the discharge ducts 52, 52 and the side frames 46, 46.

Figure 4:
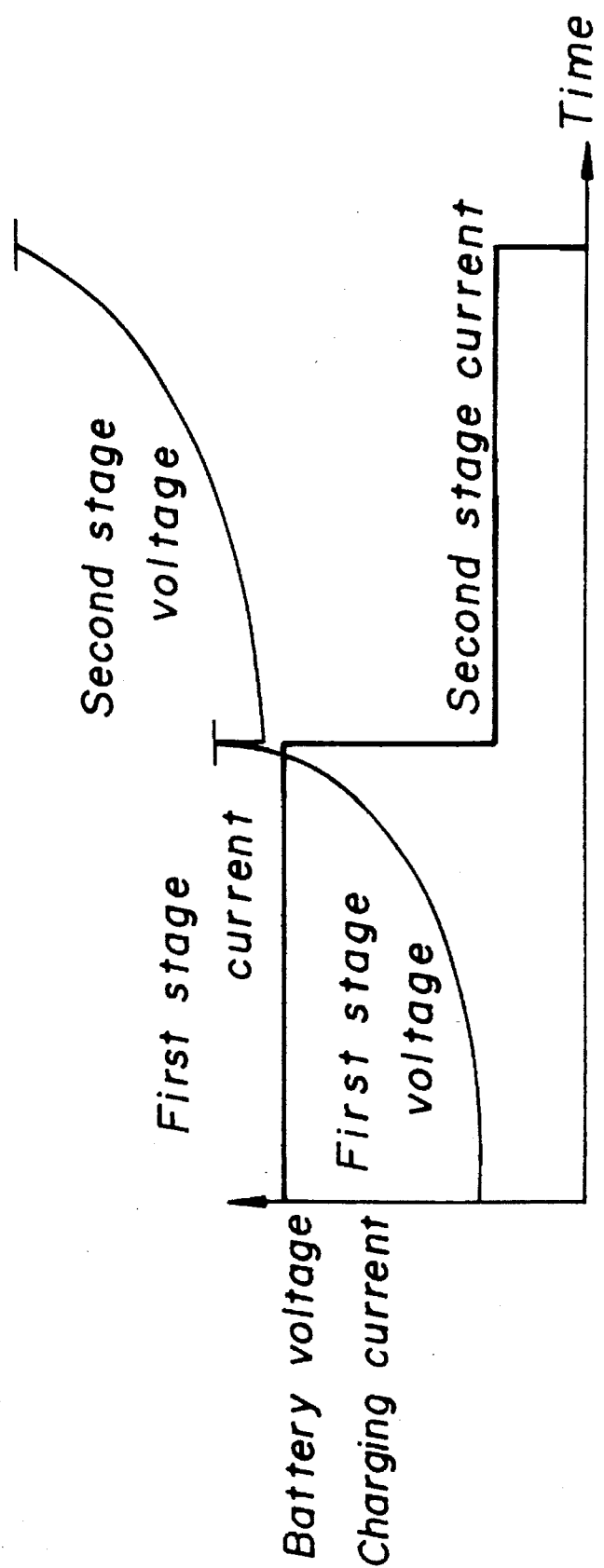
FIG. 4 is a graph illustrating the charging characteristic of a charger used to the charge batteries in the electric automobile.

As shown in FIG. 2, a plug 54 is mounted in the vicinity of the outer surface of the automobile 1 and may be connected to the external charger C by an electric wiring cord 55. The batteries 41, 41, - - - in the battery chamber 40 are charged by the charger C. The charger C is of a constant current type and switchable between a first stage mode for supplying a high charging current and a second stage mode for supplying a low charging current. Usually, a high first stage current is supplied at the start of charging and switched over to a low second stage current after the charging is considerably advanced. The battery voltage is increased as shown in FIG. 4 by the first and second stage currents.

The switchover of the charging current can be performed not only by the charger C but also by a signal fed from the automobile 1. To this end, a charging wire as well as a signal wire are included in the wiring cord 55 of the charger C connected to the plug 54.

A connection sensor 73 (see FIG. 5) is provided on the plug 54 for detecting the fact that the plug 54 has been connected to the charger C. A battery sensor unit 57 is mounted along a wire 56 interconnecting the plug 54 and the batteries 41, 41, - - - and comprises a charging-current sensor 70 for detecting the charging current flowing through the wire 56, a battery voltage sensor 71 for detecting the battery voltage and a service current sensor 72 for detecting the current value of the current being used from the batteries 41, 41, - - - .

Further, an interior sensor unit 58 is mounted in the battery chamber 40 and comprises a battery temperature sensor 67 for detecting the temperature in the battery chamber, i.e., the battery temperature, an $H_2$ concentration sensor 68 for detecting the concentration of hydrogen gas in the battery chamber 40 and the like. In addition, an exterior sensor unit 59 is mounted in the automobile 1 and comprises an outside-air temperature sensor 66 for detecting the temperature of the outside air, a CO concentration sensor 69 for detecting the concentration of carbon monoxide in the outside air and the like.

The parts or components mounted in the electric automobile 1, e.g., the travelling motor M, the air conditioner 3 and the electric fans 42 and 43 in the battery chamber 40 or the damper 51 for switchover of the air taken into the battery chamber 40 and the like are driven by electric power from the batteries 41, 41, - - - . The supply of the electric power from the batteries 41, 41, - - - to each of the parts or components is controlled by a control unit 60 mounted in the compartment 2.

Figure 5:
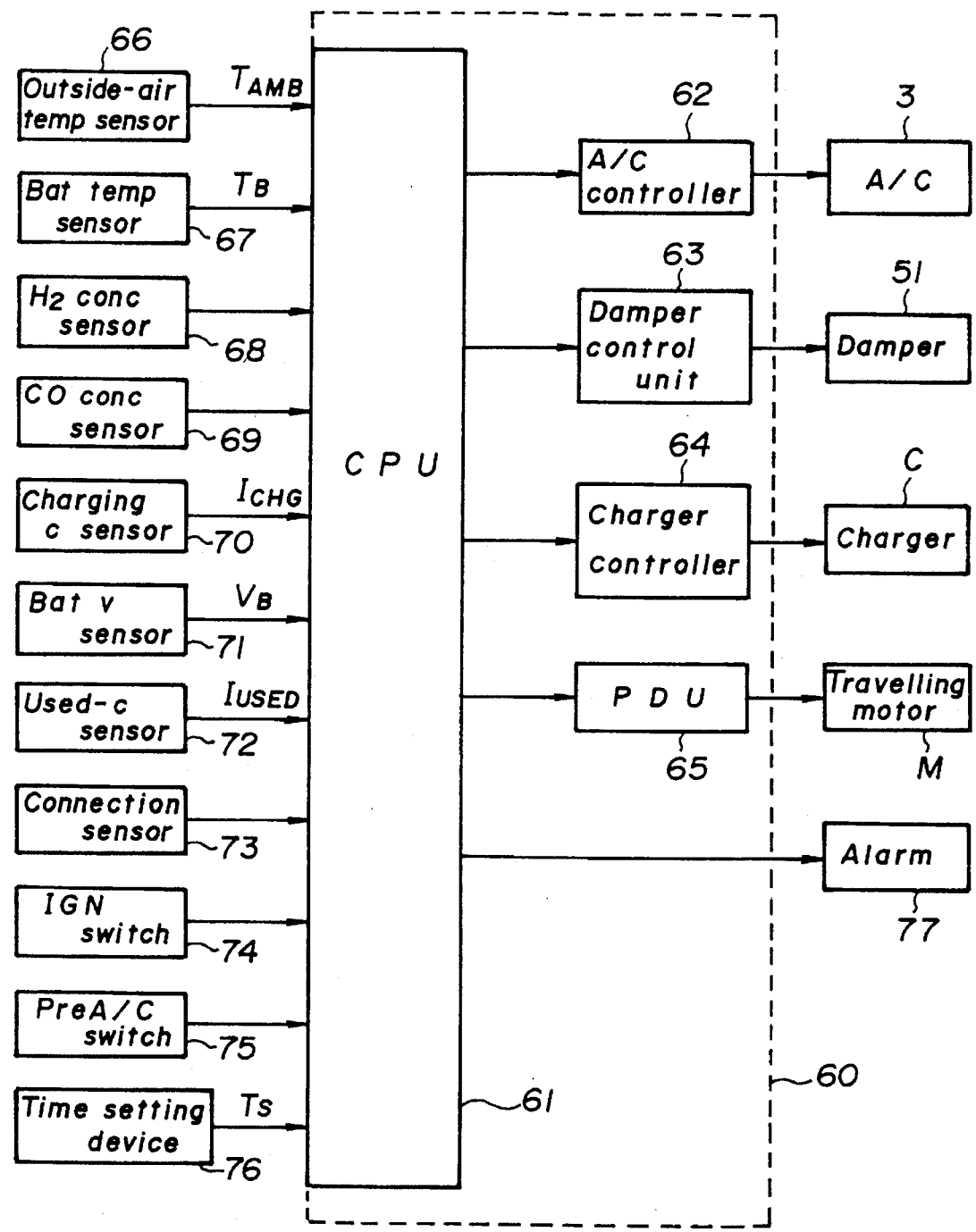
FIG. 5 is a block diagram of a control unit in the battery temperature control system.

As shown in FIG. 5, the control unit 60 for controlling the battery temperature is comprised of an air conditioner controller 62 for controlling the air conditioner 3, a damper control unit 63 for controlling the damper 51 for switchover of the air intake port in the battery chamber 40, a charger controller 64 for controlling the charger 40, and a power drive unit 65 for controlling the travelling motor M. Signals received by a central processing unit 61 are an outside-air temperature signal $T_{AMS}$ from the outside-air temperature sensor 66, a battery temperature signal $T_B$ from the battery temperature sensor 67, a hydrogen gas concentration signal from the $H_2$ concentration sensor 68, a carbon monoxide concentration signal from the CO concentration sensor 69, a charging current signal $I_{CHG}$ from the charging current sensor 70, a battery voltage signal $V_B$ from the battery voltage sensor 71, a signal of the electric current being used from the batteries from service current sensor 72, a charger connection sensor from the connection sensor 73, an ignition signal from an ignition switch 74, a setting signal from a preset air conditioner switch 75, and a set time signal $T_S$ from a prearranged departure time setting device 76. Among them, the ignition switch 74 is turned ON when the automobile 1 is to be driven to travel. This ignition switch 74 corresponds to an ignition switch in a conventional automobile having an internal combustion engine as a power source. The preset air conditioner switch 75 and the prearranged departure time setting device 76 are used when the air conditioner 3 is desired to be operated before a driver departs in the automobile. If the preset air conditioner switch 75 is previously set and the prearranged departure time $T_S$ is previously set in the time setting device 76, the air conditioner 3 is operated before the driver gets into and departs in the automobile, and thus, the interior of the compartment 2 is heated to a comfortable temperature at the time when the driver gets into the automobile.

An alarm means 77 such as an alarm indicating lamp or an alarm sound generating device is connected to the control unit 60 and is adapted to be operated by a signal from the control unit 60.

A control as described below is carried out in the control unit 60.

As shown in FIG. 6A, when the control is started, signals received from the sensors are read at a step S1. Then, it is judged by comparison at a step S2 whether or not the outside-air temperature $T_{AMS}$ is equal to or lower than 50° C. The concentrations of hydrogen gas and carbon monoxide in the outside air are compared with a predetermined value at steps S3 and S4, respectively. If these concentrations are equal to or less than the predetermined values, respectively, the position of the ignition switch 74 is determined at a next step S5, i.e., it is judged whether the automobile 1 is travelling. If the ignition switch 74 is ON, an ignition flag $F_{IGN}$ is brought into "1" at a step S6.

If it is decided at the step S5 that the ignition switch 74 is OFF, the ignition flag $F_{IGN}$ is brought into "0" at a step S7. It is judged at a step S8 whether or not the preset air conditioner switch 75 has been turned ON. If the preset air conditioner switch 75 is ON, the current time T indicated by a clock included in the central processing unit 61 is compared with the prearranged departure time $T_S$ set in the time setting device 76 at a step S9, and it is judged whether or not the current time T is in a range of 30 minutes before or after the set time $T_s$. If the current time T is in such range, it is judged by comparison at a step S10 whether or not the battery temperature $T_B$ is equal to or higher than 25° C.

If the ignition switch 74 is ON or if the determination is NO at the step S8 or step S9, even if the ignition switch 74 is OFF, and further if it is decided at the step S10 that the battery temperature $T_B$ is equal to or higher than 25° C., the processing is advanced to a step S11 shown in FIG. 6B, at which it is judged whether or not an air conditioner flag $F_{AC}$ is "0". If the air conditioner flag $F_{AC}$ is "0", a cooling flag $F_{COOL}$, a heating flag $F_{HTR}$ and a combustion heater flag $F_{FFH}$ are reset at steps S12, S13 and S14, respectively. Then, it is judged at a step S15 whether or not the battery temperature $T_B$ is equal to or lower than 40° C. If it is equal to or lower than 40° C., it is further judged at a step S16 whether or not the battery temperature $T_B$ is lower than 10° C. If the battery temperature $T_B$ is lower than 10° C., it is judged at a step S17 whether or not the outside-air temperature $T_{AMS}$ is equal to or higher than 5° C. If YES, the heating flag $F_{HTR}$ is brought into "1". On the other hand, if NO at the step S17, i.e., when the outside-air temperature $T_{AMS}$ is lower than 5° C., the combustion heater flag $F_{FFH}$ is brought into "1".

If it is decided at the step S15 that the battery temperature $T_B$ is higher than 40° C., the cooling flag $F_{COOL}$ is brought into "1" at a step S20.

On the other hand, if it is decided at the step S16 that the battery temperature $T_B$ is equal to or higher than 10° C., the air conditioner flag $F_{AC}$ is reset to "0" at a step S21, returning to the start, because the battery temperature $T_B$ is in a proper temperature range between 10° C. and 40° C.

Even when it is decided at the step S10 that the battery temperature $T_B$ is lower than 25° C., the flags $F_{AC}$, $F_{COOL}$, $F_{HTR}$ and $F_{FFH}$ are reset to "0" at steps S22 to S25, respectively, and then the processing is returned to the step S17 and thereafter, the above-described control is carried out.

When "1" is established for any one of the flags at the steps S18, S19 and S20, respectively, the processing is advanced to a step S26 shown in FIG. 6C. At the step S26, it is judged whether or not the charging plug 54 of the automobile 1 has been connected to the charger C. If it is decided that the charger C has been connected, a charging flag $F_{CHG}$ is brought into "1" at a step S27. Then, it is judged at a step S28 whether or not the charging current $I_{CHG}$ at that time is equal to 0 (zero). If the charging current $I_{CHG}$ at that time is equal to 0 (zero), the processing is advanced to a step S29, at which a signal indicative of a command to turn ON the switch of the charger C is delivered. Further, a signal indicative of a command to set the charging current of the charger C at a higher first stage current is delivered at a step S30.

On the other hand, if it is decided at the step S28 that the charging current $I_{CHG}$ is not equal to 0, it is judged at a step S31 whether or not the charging current $I_{CHG}$ is equal to the lower second stage current. If the charging current is at the lower second stage current, the processing is advanced to the step S30 at which the charging current is changed-over to the first stage current. That is, the charging current $I_{CHG}$ is increased. If it is decided at the step S31 that the charging current $I_{CHG}$ is not equal to the lower second stage current, it is judged at a step S32 whether or not the charging current $I_{CHG}$ is the first stage current.

In this way, when the charger C has been connected, the charging current $I_{CHG}$ supplied from the charger C is brought into the first higher stage current, progressing to a next step S33.

Even when it is decided at the step S26 that the charger has not been connected, the charging flag $F_{CHG}$ is set at "0" at a step S34, likewise progressing to the step S33.

At the step S33, it is judged whether or not the battery voltage $V_B$ is higher than the minimum voltage $V_{MIN}$. The minimum voltage $V_{MIN}$ is a smallest voltage previously determined in order to prevent the battery 41 from being brought into an over-discharged state. Only when the battery voltage $V_B$ is higher than the minimum voltage $V_{MIN}$, the air conditioner flag $F_{AC}$ is set at "1" at a next step S35.

Figure 6D:
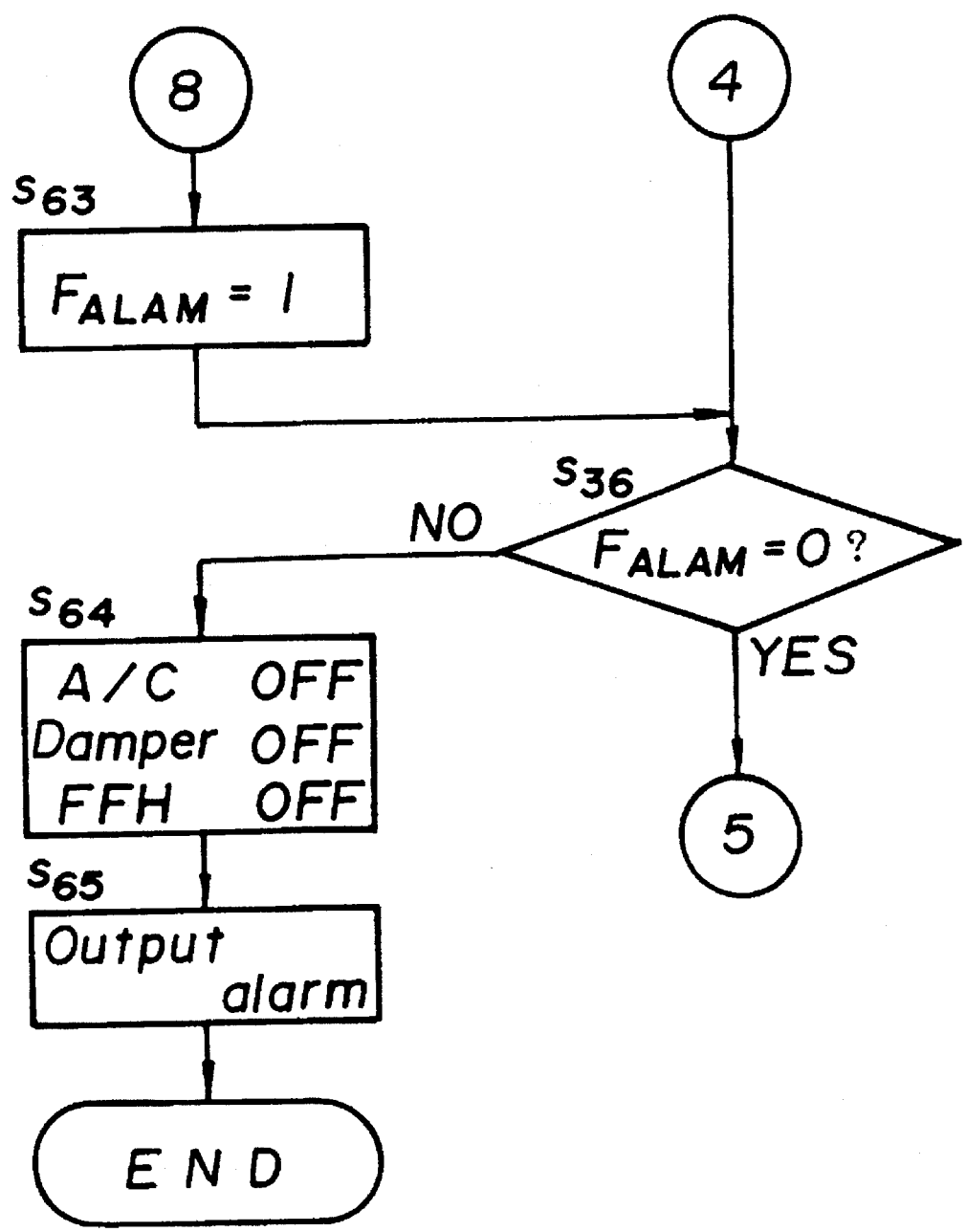
FIG. 6D is a fourth flow chart illustrating the operation of the control unit.

Then, it is judged at a step S36 shown in FIG. 6D whether an alarm flag $F_{ALAM}$ is "0". If the alarm flag $F_{ALAM}$ is "0" it is judged at a step S37 shown in FIG. 6E whether the air conditioner flag $F_{AC}$ is "1". If the air conditioner flag $F_{AC}$ is "1", it is further judged at a step S38 whether or not the cooling flag $F_{COOL}$ is "1".

If it is decided at the step S38 that the cooling flag $F_{COOL}$ is "1", signals indicative of commands to drive the air conditioner 3 in the cooling mode and to drive the dampers 51 in the battery chamber 40 to the temperature-conditioned air intake position are delivered at a step S39. If it is decided at the step S38 that the cooling flag $F_{COOL}$ is "0" it is judged at a step S40 whether or not the heating flag $F_{HTR}$ is "1". If the heating flag $F_{HTR}$ is "1" signals indicative of commands to drive the air conditioner 3 in the heating mode and to drive the dampers 51 to the temperature-conditioned air intake position are delivered at a step S41. In these cases, a signal indicative of a command to operate the combustion heater 29 is not delivered.

On the other hand, if it is decided at the step S40 that the heating flag $F_{HTR}$ is "0", it is judged at a step S42 whether or not a combustion heater flag $F_{FFH}$ is "1", and, if so, signals indicative of commands to stop the heat pump cycle of the air conditioner 3, to drive the dampers 51 to the temperature-conditioned air intake position and to operate the combustion heater 29 are delivered at a step S43.

When the signal indicative of the command to operate the air conditioner 3 has been delivered at the step S39, S41 or S43, the processing is advanced to a step S44, at which it is judged whether or not the ignition flag $F_{IGN}$ is "1". If the ignition flag $F_{IGN}$ is "1" it is judged at a step S45 whether or not the current $I_{USED}$ to be used at that time is equal to or lower than the maximum current $I_{MAX}$ available in the entire automobile 1. If YES, the processing is returned to the start. Even when it is decided at the step S44 that the ignition flag $F_{IGN}$ is not "1", the processing is returned to the start.

On the other hand, if it is decided at the step S45 that the used current $I_{USED}$ exceeds the maximum current $I_{MAX}$, a signal indicative of a command to reduce the current supplied to the travelling motor M is delivered, and then the routine returns to the step S45.

If it is decided at the step S11 that the air conditioner flag $F_{AC}$ is "1", the processing is advanced to a step S47 shown in FIG. 6F, at which it is judged whether or not the cooling flag $F_{COOL}$ has been set at "1". If the cooling flag $F_{COOL}$ is "1", it is judged by comparison at a step S48 whether or not the battery temperature $T_B$ is equal to or lower than 30° C. If the battery temperature $T_B$ is equal to or lower than 30° C., the air conditioner flag $F_{AC}$ is reset to "0" at a step S49. Even when it is decided at the step S47 that the cooling flag $F_{COOL}$ is not "1", and if it is decided at a step S50 that the battery temperature $T_B$ is equal to or higher than 20° C., the air conditioner flag $F_{AC}$ is likewise reset to "0" at the step S49.

On the other hand, if it is decided at the step S50 that the battery temperature $T_B$ is lower than 20° C., it is judged at a step S51 whether or not the outside-air temperature $T_{AMS}$ is equal to or higher than 5° C. If the outside-air temperature $T_{AMS}$ is equal to or higher than 5° C., the heater flag $F_{FFH}$ is reset to "0" at a step S52, and the heating flag $F_{HTR}$ is set at "1" at a step S53. If it is decided at the step S51 that the outside-air temperature $T_{AMS}$ is lower than 5° C., the heating flag $F_{HTR}$ is reset to "0" at a step S54, and the heater flag $F_{FFH}$ is set to "1" at a step S55.

Figure 6E:
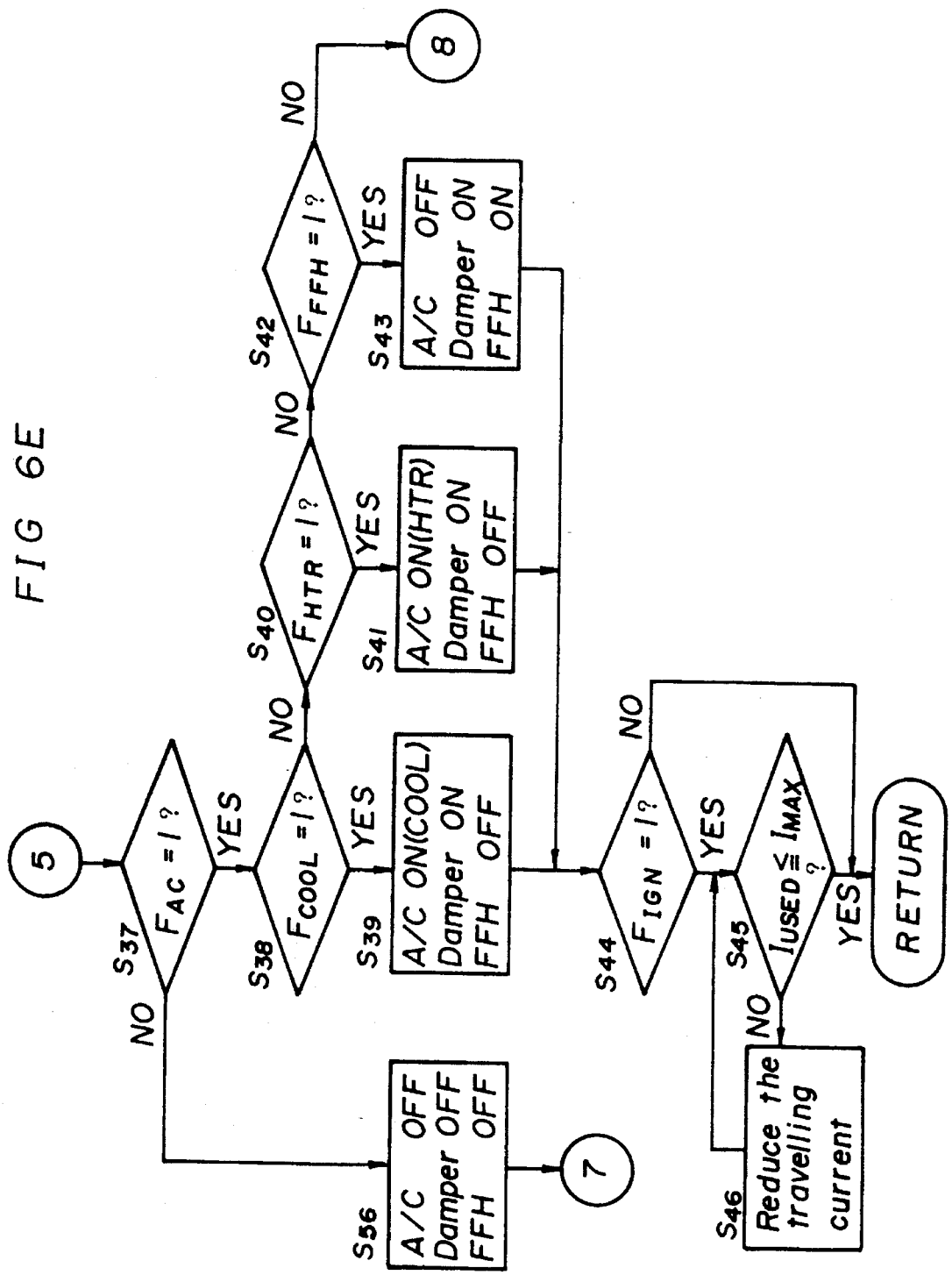
FIG. 6E is a fifth flow chart illustrating the operation of the control unit.

When the air conditioner flag $F_{AC}$ has been reset to "0" at the step S49, the processing is advanced to the above-described step S37 shown in FIG. 6E.

If it is decided at the step S48 that the battery temperature $T_B$ is higher than 30° C. and if the flag is set at "1" at the step S53 or S55, the processing is advanced to the step S26 shown in FIG. 6C.

On the other hand, if it is decided at the step S37 shown in FIG. 6E that the air conditioner flag $F_{AC}$ is not "1", signals indicative of a command to operate the damper 1 in the battery chamber 40 back to the outside-air intake position and to fully stop the operation of the air conditioner 3 are delivered at a step S56.

Figure 6G:
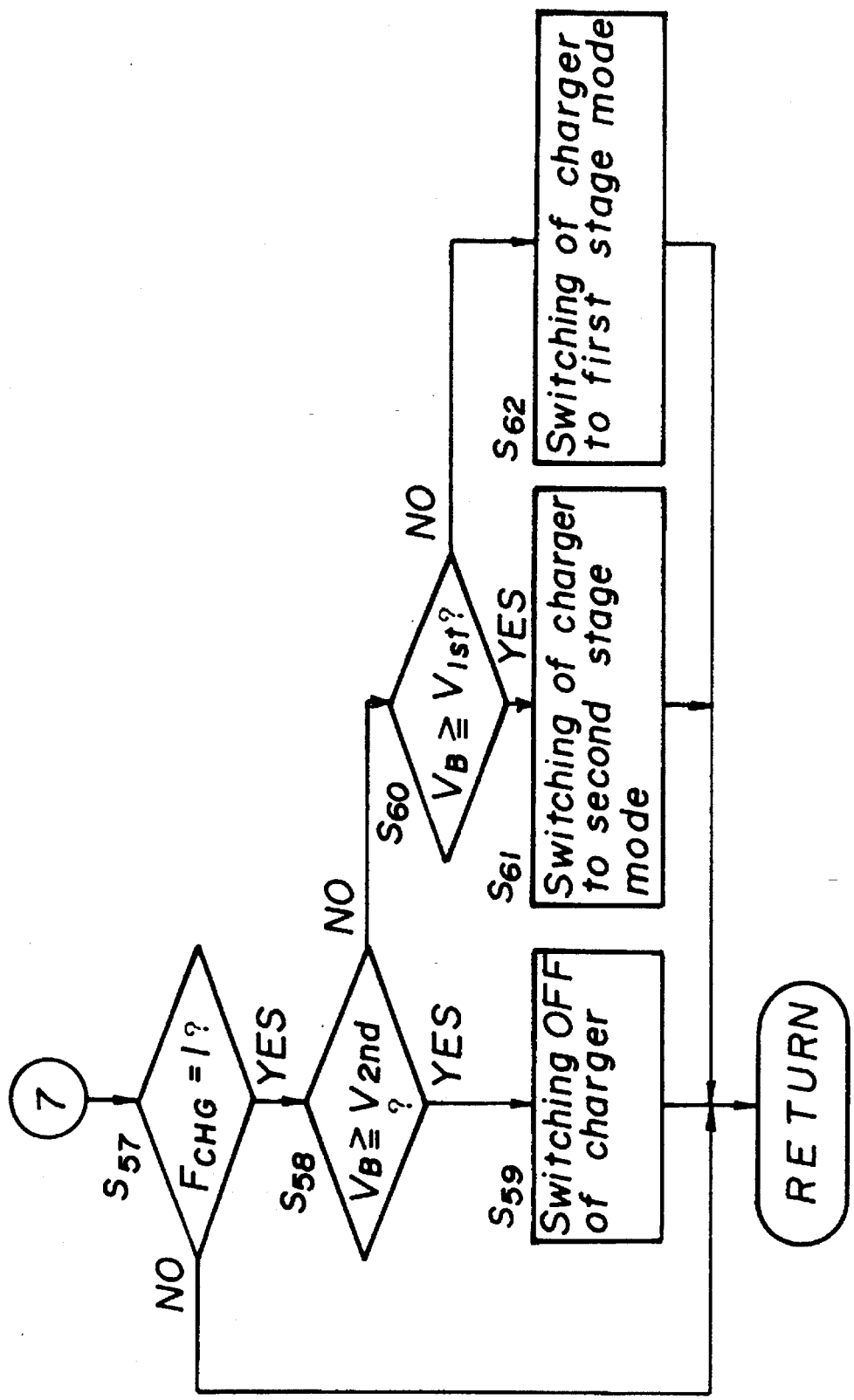
FIG. 6G is a seventh flow chart illustrating the operation of the control unit.

At this time, the processing is advanced to a next step S57 shown in FIG. 6G, at which it is judged whether or not the charging flag $F_{CHG}$ has been set at "1". If the charging flag $F_{CHG}$ is "1", it is judged at a step S58 whether or not the current battery voltage $V_B$ is equal to or higher than a predetermined battery voltage $V_{2nd}$ at the time when the charger C is in the second stage mode. If the current battery voltage $V_B$ is sufficiently high, it is judged that the charging has been completed and hence, the switch of the charger C is turned OFF at a step S59. If NO at the step S58, the current battery voltage $V_B$ is compared at a next step S60 with a predetermined battery voltage $V_{1st}$ at the time when the charger C is in the first stage mode. If the current battery voltage $V_B$ is higher than such battery voltage, the charger C is switched over to the second stage mode at a step S61. If it is decided at the step S60 that the current battery voltage $V_B$ is lower than such battery voltage, a signal indicative of a command to maintain the charger C in the first stage mode is delivered at a step S62.

After completion of these steps, the processing is returned to the start.

If the determination is NO at any of the steps S2, S3 and S4 shown in FIG. 6A as described above or the steps S32 or S33 shown in FIG. 6C, the processing is advanced to the step S63 shown in FIG. 6D, at which the alarm flag $F_{ALAM}$ is set at "1" at the step S63. Then, the processing is passed to the above-described step S36. At this step S36, it is decided that the flag $F_{ALAM}$ is not "0" and hence, the processing is advanced to a step S64, at which signals indicative of commands to operate the dampers 51 in the battery chamber 40 back to the outside-air intake position and to stop the operation of the air conditioner 3 are delivered. Further, at step S65 a signal indicative of a command to operate the alarm 77 is delivered. In such case, the control is stopped at this stage.

The operation of the battery temperature control system constructed in the above manner will be described below.

In charging the batteries 41, 41, - - - , the charger C is connected to the charging plug 54 and set at the first stage mode. By doing so, the charging current flows through the charging wiring 56 to the batteries 41, 41, - - - and a portion of such current flows via the batteries 41, 41 - - - to the control unit 60. Thus, the control unit 60 is activated to start the control.

When the control is started, the signals from the sensors are first read, as described above. Usually, the outside-air temperature $T_{AMS}$ is equal to or lower than 50° C, and the concentration of hydrogen gas in the battery chamber 40 is low, while the concentration of carbon monoxide in the outside-air is also low. During charging, the ignition switch 74 is OFF. Therefore, the processing is advanced to the control step S7, at which the ignition flag $F_{IGN}$ is brought into "0".

Here, assuming that the preset air conditioner switch 75 has not been set, the processing is advanced to the control step S11. When the air conditioner switch in the automobile 1 is OFF, the air conditioner flag $F_{AG}$ is "0" and hence, the cooling flag $F_{COOL}$, the heating flag $F_{HTR}$ and the combustion heater flag $F_{FFH}$ are all reset to "0". Usually, the battery temperature $T_B$ is equal to or lower than 40° C. at an initial stage of charging. Therefore, the processing is advanced to the step S16. If the battery temperature $T_B$ is equal to or higher than 10° C., it is decided that the battery 41 is at a proper temperature and hence, the air conditioner flag $F_{AC}$ is reset to "0" at the step S21. Then, the processing is returned to the start, and as long as such condition is continued, the above-described operations are repeated. That is, the air conditioner 3 is maintained at the standby state.

At the start of charging in a cold condition, such as the winter season, the battery temperature $T_B$ may be equal to or lower than 10° C. In such a lower temperature condition, the charging efficiency is poor. In such a case, it is judged at the step S16 that the battery temperature $T_B$ is lower than 10° C., thereby progressing to the step S17. Then, it is judged at the step S17 whether or not the outside-air temperature $T_{AMS}$ is equal to or higher than 5° C., and in accordance with the result thereof, either the heating flag $F_{HTR}$ or the combustion heater flag $F_{FFH}$ is brought into "1".

At this time, the charger C has been already connected to the charging plug 54, and the connection signal has been already received from the connection sensor 73. Therefore, the processing is advanced to the step S27, at which the charging flag $F_{CHG}$ is set to "1". In addition, the charger C starts in the first stage mode and hence, the processing is advanced to the step S33. Further, the battery voltage $V_B$ is usually higher than the minimum voltage $V_{MIN}$. Therefore, in this case, the air conditioner flag $F_{AC}$ is set to "1" at the step S35.

When the air conditioner flag $F_{AC}$ has been set to "1", the processing is advanced to the step S38, unless there is an abnormality. The cooling flag $F_{COOL}$ is "0" and hence, when the heating flag $F_{HTR}$ is "1", the processing is advanced to the step S41, or when the combustion heater flag $F_{FFH}$ is "1", the processing is advanced to the step S43. In this way, when the outside-air temperature is equal to or higher than 5° C., signals indicative of commands to drive the heat pump cycle of the air conditioner 3 in the heating mode and to drive the dampers 51 are delivered. When the outside-air temperature is lower than 5° C., signals indicative of commands to drive the combustion heater 29 and the dampers 51 are delivered.

When such signal indicative of the command to drive the air conditioner have been delivered in this manner at the step S41 or S43, the processing is advanced to the step S44, but during charging, the ignition flag $F_{IGN}$ is maintained at "0". Therefore, the operation from the start is carried out again. At this time, the air conditioner flag $F_{AC}$ has been already set at "1" and hence, the processing is advanced from the step S11 to a step S47. The cooling flag $F_{COOL}$ is "0" and hence, it is judged at a step S50 whether or not the battery temperature $T_B$ has reached 20° C. If the battery temperature $T_B$ is still lower than 20° C., it is also judged at a step S51 whether or not the outside-air temperature is equal to or higher than 5° C. If the outside-air temperature is equal to or higher than 5° C. the combustion heater flag $F_{FFH}$ is reset to "0", and the heating flag $F_{HTR}$ is set at "1". If the outside-air temperature is lower than 5° C., the heating flag $F_{HTR}$ is reset to "0" and, the heater flag $F_{FFH}$ is set at "1". Then, the operations after the step S26 are carried out in the same manner as the last time. If the outside-air temperature is equal to or higher than 5° C., the signals indicative of the commands to drive the air conditioner 3 in the heating mode and to drive the dampers 51 are delivered. If the outside-air temperature is lower than 5° C., signals indicative of commands to operate the combustion heater 29 and the drive the dampers 51 are delivered.

In this manner, the same operations are repeated, until the battery temperature $T_B$ reaches 20° C., and the delivery of a signal therefor is continued.

When the signal indicative of the command to drive the air conditioner 3 in the heating mode has been delivered, the four-way valve 15 is shifted, so that the refrigerant compressed by the compressor 12 is fed toward the interior heat exchanger 5. Then, the compressor 12 and the electric fans 22, 27 and 34 are driven. In addition, the outside-air introduction port 19 and the air discharge port 21 in the first heat exchanger chamber 6 and the outside-air intake port 24 in the second heat exchanger chamber 7 are opened. At this time, the cooling-air intake port 33 and the heat discharge port 36 in the compressor chamber 11, and the air discharge ports 31a, 31b and 31c for discharging the air from the second heat exchanger chamber 7 into the compartment 2 are left closed. In this condition, the transfer of heat from the refrigerant to the air is accomplished by the interior heat exchanger 5, so that the air passed through the interior heat exchanger 5 is heated. Thus, warm air is supplied from the air conditioner 3.

When the signal indicative of the command to drive the combustion heater 29 has been delivered, the hot water or other liquid is fed from the combustion heater 29 to the auxiliary heating heat exchanger 28, and the air mixing damper 30 is turned to the position shown by the phantom line in FIG. 1 to open the front surface of the heat exchanger 28. The temperature of the air blown through the discharge port may be controlled by the opening degree of the air mixing damper 30. Then, the outside-air intake port 24 in the second heat exchanger chamber 7 is opened, and the interior electric fan 27 is driven. The other ports are generally maintained closed, and the compressor 12 and the electric fans 22 and 34 are maintained in their stopped states. In this conditions, the air taken-in through the outside-air intake port 24 by the interior electric fan 24 is passed through the interior heat exchanger 5 and then through the auxiliary heat exchanger 28. Thus, such air is heated by the auxiliary heat exchanger 28. That is, even at this time, warm air is supplied from the air conditioner 3.

When the signal indicative of the command to drive the dampers 51 has been delivered, the air duct 44 connecting the air conditioner 3 with the battery chamber 40 is brought into a communicating state. Moreover, when the dampers 51 are driven in this manner, the electric fans 42 and 43 in the battery chamber 40 are driven in operative association with the driving of the dampers 51. As a result, the warm air supplied from the air conditioner 3 is drawn by the electric fan 42 in the battery chamber 40 to flow from the temperature conditioned air intake port 45 at the lower end of the instrument panel 9 through the air duct 44 into the battery chamber 40. In the battery chamber 40, such warm air is guided to and around each of the batteries 41, 41, - - - by the baffle plate 42a, thereby heating the batteries 41, 41, - - - . The air cooled by heating the batteries 41, 41, - - - is drawn by the rear electric fan 43 in the battery chamber 40 and discharged rearwardly outside the vehicle through the air discharge ducts 52, 52 and the side frames 46, 46.

In this way, when the battery temperature $T_B$ is equal to or lower than 10° C., the driving of the air conditioner 3 is started, so that warm air is supplied from the air conditioner 3 into the battery chamber 40, until the temperature $T_B$ reaches 20° C. Thus, the battery 41 is heated by such warm air. Moreover, if the outside-air temperature $T_{AMS}$ is varying around 5° C. for such period, the heating of the air by the heat pump cycle of the air conditioner 3 or the heating of the air by the combustion heater 29 are correspondingly switched over from one to the other. If a sufficient heating of the air cannot be provided by the heat pump cycle, the heat from the com-bustion heater 29 is utilized and therefore, the battery 41 is heated reliably. Thus, the charging efficiency is maintained satisfactorily.

After the charging operation advances, the switch of the charger C is usually switched over to the second stage position, thereby providing the reduced charging current $I_{CHG}$. When the charging has been completed, the switch of the charger C is turned OFF. However, when the present control system is operating to heat or cool the batteries 41, 41 - - - and the charger C is switched-over to the second stage mode, this fact is judged at the step S31, and a signal indicative of a command to switch over the charger C to the first stage mode is delivered at the step S30. When the switch of the charger C is turned OFF, so that the charging current $I_{CHG}$ becomes 0 (zero), this fact is judged at the step S28. A signal indicative of a command to turn ON the switch of charger C is delivered at the step S29, and the charger C is set at the first stage mode at the step S30. Thus, the charging current from the charger C is maintained at the higher first stage current level on the basis of a signal from the automobile 1. The air conditioner 3 is driven by such charging power. This ensures that the electric charge of the batteries which are being charged is prevented from being consumed.

When the battery temperature $T_B$ reaches 20° C., this fact is judged at a step S50, and the air conditioner flag $F_C$ is reset to "0" at a step S49. Therefore, the processing is advanced from the step S37 to the step S50, and a signal indicative of a command to complete the driving of the dampers 51 is delivered. When the dampers 51 driving signal is stopped, the dampers 51 mounted in the air duct 44 are moved back to the position shown by the phantom line in FIG. 3. Thus, the temperature-conditioned air intake port 45 for supplying the air from the air conditioner 3 is shut off, and the outside-air intake ports 50, 50 are opened.

When the outside-air intake ports 50, 50 are open in this way, the outside air is permitted to flow through the openings 47 at the front end of each of the side frames 46, 46 and via the intake ducts 49, 49 into the battery chamber 40. Thus, the ventilation of the interior of the battery chamber 40 is performed by such outside air.

When a signal indicative of a command to stop the air conditioner 3 has been delivered in this manner, the processing is advanced to a step S57. At this time, the charging flag $F_{CHG}$ has been set at "1" and hence, at a step S58, it is judged whether or not the current battery voltage $V_B$ is higher than a battery voltage $V_{2nd}$ at the time when the battery is charged by the second charging current from the charger C. If the current battery voltage $V_B$ is sufficiently high, it is decided that the charging of the battery 41 has been completed and hence, the switch of the charger C is turned OFF. On the other hand, if the current battery voltage $V_B$ is lower than the battery voltage $V_{2nd}$ at the time when the battery is charged by the second charging current, it is believed that the charging is not completed. Therefore, the current battery voltage $V_B$ is compared with a battery voltage $V_{1st}$ at the time when the battery is charged by the first charging current from the charger C in step S60, and on the basis of the result of such comparison, the charger C is switched over to the second or first stage mode.

In this manner, the charger C with the charging current increased to heat the battery 41 is returned to the usual charging state.

The interior of the battery chamber 40 may be at an increased temperature in the summer season. Moreover, the charging of the batteries 41, 41 - - - is performed by a chemical reaction and hence, during the charging, heat is generated. Thus, the battery temperature $T_B$ is increased during the advance of the charging. Particularly, the increase of such temperature is violent during a rapid charging. Therefore, during charging in the summer season, the battery temperature $T_B$ may become as high as 50° C. or more. Additionally, when the batteries 41 are charged just after a high load operation of the automobile 1 for a long period of time, the battery temperature $T_B$ may become 50° C. or more. When the battery temperature $T_B$ increases to such a high temperature, not only the efficiency of charging the batteries 41 is reduced, but also the life of each battery 41 is significantly reduced.

Thus, in the present battery temperature control system, when the battery temperature $T_B$ exceeds 40° C., this fact is judged at the control step S15. Then, the cooling flag $F_{COOL}$ is set at "1" at the step S20, and the charger C is switched over to the first stage mode at the steps S26 to 30. Thereafter, the air conditioner flag $F_{AC}$ is set at "1" at the step S35. Thus, the processing is advanced to the step S39, at which signals indicative of the commands to drive the air conditioner 3 in the cooling mode and to drive the dampers 51 are delivered. Then, the operations are carried out again from the start, progressing from the step S11 to the step S48. Unless the battery temperature $T_B$ is dropped down to 30° C. or less, the delivery of the signals is continued.

When the signal indicative of the command to drive the air conditioner 3 in the cooling mode has been delivered, the four-way valve 15 is shifted so that the refrigerant compressed by the compressor 12 is fed toward the exterior heat exchanger 4. In addition, the compressor 12 and the electric fans 22, 27 and 34 are driven. At this time, in addition to the outside-air introduction port 19 and the air discharge port 21 in the first heat exchanger chamber 6 and the outside-air intake port 24 in the second heat exchanger chamber 7, the cooling-air intake port 33 and the heat discharge port 36 in the compressor chamber 11 are also opened. The air discharge ports 31a, 31b and 31c for discharging air into the compartment 2 are left closed. In this condition, the refrigerant is vaporized in the interior heat exchanger 5, so that heat is taken from the air passed through the heat exchanger 5 by the heat of such vaporization. Thus, cool air is supplied from the air conditioner 3.

At this time, the dampers 51 in the battery chamber 40 are turned by the damper driving signal to bring the air duct 44 into the communicating state, and the electric fans 42 and 43 are driven, so that the cool air supplied from the air conditioner 3 is drawn into the battery chamber 40. Thus, the batteries 41, 41 - - - are cooled.

When the battery temperature $T_B$ is reduced down to 30° C. or less, this fact is judged at the step S48, and the air conditioner flag $F_{AC}$ is reset to "0" at the step S49. Therefore, signals indicative of commands to stop the air conditioner 3 and to drive the dampers 51 back to the position in which the outside-air intake ports 50 are opened are delivered at the step S56.

In this manner, when the battery temperature $T_B$ is equal to or higher than 40° C., the driving of the air conditioner 3 is started, so that the cool air is supplied from the air conditioner 3 into the battery chamber 40, until the battery temperature $T_B$ is reduced to 30° C. or less. When the battery temperature $T_B$ has been thus reduced to 30° C. or less, the air conditioner 3 is stopped and thereafter, the charger is returned to the usual charging state.

In this way, the present battery temperature control system ensures that the battery temperature $T_B$ is maintained in a predetermined range between 30° C. as the upper limit temperature and 20° C. as the lower limit temperature by properly driving the air conditioner 3 mounted in the automobile 1 during charging of the batteries 41, 41, - - - . Therefore, it is possible to insure the efficiency of charging the batteries 41, 41, - - - and to prevent the reduction in life thereof.

When the batteries are charged in a condition in which the preset air conditioner switch 75 has been set, it is judged at the step S9 whether or not the current time T is before and after 30 minutes from the prearranged departure time $T_S$. If there are 30 minutes or more before the prearranged departure time $T_S$, the same control is carried out as when the preset air conditioner switch 75 is not set. More specifically, the air conditioner 3 is driven in the cooling mode, when the battery temperature $T_B$ is equal to or higher than 40° C. The air conditioner 3 is driven in the heating mode, when the battery temperature $T_B$ is equal to or lower than 10° C. and the outside air temperature $T_{AMS}$ is higher than 5° C. In addition, when the battery temperature $T_B$ is equal to or lower than 10° C. and the outside-air temperature $T_{AMS}$ is equal to or lower than 5° C. the combustion heater 29 is driven Therefore, the batteries 41, 41, - - - are cooled or heated. In this case, the cooling and heating of the compartment 2 are not performed.

On the other hand, if the current time T is between the times 30 minutes before and after the prearranged departure time $T_S$, it is judged at the step S10 whether or not the battery temperature $T_B$ is equal to or higher than 25° C. If the battery temperature $T_B$ is equal to or higher than 25° C., the processing is likewise advanced to the step S15, and then, when the battery temperature $T_B$ is higher than 40° C., the air conditioner 3 is driven in the cooling mode. Even if the battery temperature $T_B$ is equal to or lower than 40° C., it is higher than at least 25° C. at this time and it is not necessary to heat the batteries 41, 41 - - - . Therefore, the air conditioner 3 is not operated for heating the batteries. Further, when the battery temperature $T_B$ is lower than 25° C., it is not necessary to cool the battery 41. Therefore, the flags are reset to "0" at the steps S22 to S25, respectively, progressing to the step S17. If the outside-air temperature $T_{AMS}$ is equal to or higher than 5° C., the air conditioner 3 is driven in the heating mode, and if the outside-air temperature $T_{AMS}$ is lower than 5° C., the combustion heater 29 is driven. In this case, the air blow-out port 31b or 31c prov-ided in the instrument panel 9 is opened. Thus, the cooling or heating of the compartment 2 is conducted simultaneously with the cooling or heating of the batteries 41, 41, - - - .

In this manner, when the preset air conditioner switch 75 is set, the cooling or heating of the compartment 2 is started from a time point before 30 minutes from the prearranged departure time $T_S$. If the driver does not depart in the automobile even after 30 minutes have elapsed from the prearranged departure time $T_S$, such cooling or heating is automatically stopped.

In this case, the heating is started under a lenient condition of a battery temperature $T_B$ equal to or lower than 25° C. and hence, the switch of the charger C may be OFF or switched over to the second stage mode at the start of the heating or cooling. In such case, this fact is judged at the step S26 or S31, and the charger C is switched over to the first stage mode at the step S30. Thus, the charging current supplied from the charger C is increased. The control of the temperature of the batteries 41 and the cooling or heating of the compartment 2 are conducted by such higher charging power.

When the outside-air temperature detected by the outside-air temperature sensor 66 exceeds 50° C., it is concluded that the sensor 66 is out of order. In addition, hydrogen gas is generated by the chemical reaction during charging of the batteries 41 and as a result, the concentration of hydrogen gas in the battery chamber 40 is increased to some extent, but if such concentration is increased to too high a level, it is concluded that there is an abnormality generated in the battery 41. Further, when the concentration of carbon monoxide in the outside-air is higher than a predetermined value, it is concluded that an incomplete combustion may occur in the combustion heater 29, or when an internal combustion engine type generator is used as the charger C, that this generator operation is abnormal.

If NO is determined at the step S32, the charger C is not in the first state mode or in the second stage mode, notwithstanding that the charging current $I_{CHG}$ is detected, and hence, it is concluded that the charging current sensor 70 of the charger C is out of order. If it is decided at the step S42 that the combustion heater flag $F_{FFH}$ is not "1", the air conditioner 3 is not in the cooling mode or in the heating mode, notwithstanding that the air conditioner flag $F_{AC}$ is "1", i.e., normally the air conditioner switch for operating the air conditioner 3 is ON, and hence, it is concluded that the air conditioner switch or the like is out of order.

In such a case, this fact is judged at the steps S2 to S4, and the alarm flag $F_{ALAM}$ is set at "1" at a step S63. Then, the signals indicative of the commands to drive the air conditioner 3 and the dampers 51 are delivered at a step S64, and an alarm signal is delivered at a step S65, thereby operating the alarm 77. In this case, the control of the battery temperature is stopped at such stage.

The decision at the step S33 of the fact that the battery voltage $V_B$ is lower than the minimum voltage $V_{MIN}$ is when the batteries 41 are in a state near an over-discharged state in which the batteries 41 will be damaged if further used. Thereupon, the driving of the air conditioner 3 or the like is stopped in such an event, and the alarm 77 is operated.

During travelling operation of the automobile 1, the ignition switch 74 is turned ON and this causes the battery temperature control to be started.

At this time, it is decided at the step S5 that the ignition switch 74 is ON and hence, the ignition flag $F_{IGN}$ is set at "1" at the step S6. If the air conditioner switch is not ON, the air conditioner flag $F_{AC}$ is "0" and hence, the same operations as during charging are conducted. More specifically, when the battery temperature $T_B$ becomes 40° C. or more, the driving of the air conditioner 3 in the cooling mode is started. When the battery temperature $T_B$ is equal to or lower than 10° C., the driving of the air conditioner 3 in the heating mode or the driving of the combustion heater 29 is started. However, the charger C is not connected in such case and hence, the driving of the air conditioner 3 is conducted by the batteries 41, 41, - - - . Therefore, the charging flag $F_{CHG}$ is reset at a step S34.

Then, if the signal indicative of the command to drive the air conditioner 3 or the like is delivered, the current $I_{USED}$ being used in the entire automobile 1 is compared with the maximum current $I_{MAX}$ which can be taken from the batteries 41, 41, - - - , at a step S45. If the used current $I_{USED}$ is larger than the maximum current $I_{MAX}$, a signal indicative of a command to reduce the travelling current is delivered at a step S46. When such reducing signal is delivered, the current supplied from the power drive unit 65 to the travelling motor M is reduced, and the total used current $I_{USED}$ is suppressed to within the maximum current $I_{MAX}$.

Then, the operations are conducted again from the start, and as during charging, the driving of the air conditioner 3 and the dampers 51 are stopped, when the battery temperature $T_B$ falls into a range of from 20° C. to 30° C.

When the driving of the dampers 51 is stopped, the outside-air intake port 50 provided in the air duct 44 in the battery chamber 40 is opened. Thus, the outside air admitted through the opening 47 at the front end of each side frame 46 is permitted to flow through the intake ducts 49 into the battery chamber 40. In this case, a ram pressure due to vehicle running induced wind acts on the system and hence, a sufficient amount of outside air flows through battery compartment 40 while the automobile 1 is moving. The air within the battery chamber 40 is discharged rearwardly outside the vehicle through the discharge ducts 52 and the side frames 46. In this manner, the interior of the battery chamber 40 is ventilated with good efficiency, and the temperature increase of batteries 41 is suppressed. Therefore, the amount of electric power consumed for controlling the temperature of the batteries 41 can be suppressed to a relatively low level.

In this way, even when the automobile 1 is travelling, the battery temperature $T_B$ is maintained within an appropriate range by properly driving the air conditioner 3 mounted in the automobile 1. Therefore, it is possible to maintain the output performance of the batteries 41, 41, - - - and to prevent the life thereof from being reduced.

The cooling or heating of the interior of the compartment 2 during travelling of the automobile 1 is conducted in substantially same procedure as the control of the battery temperature during the travelling of the automobile 1, but a detailed description thereof is omitted herein.

Although the electric automobile 1 equipped with the air conditioner 3 serving as both the cooling device and the heating device has been described in the above embodiment, only one of the cooling and heating devices may be mounted in some cases in an electric automobile used in only the torrid or frigid zones. Even in such a case, it is possible to prevent the reductions in performance and life of the batteries 41, 41, - - - due to rising or falling of the battery temperature by a construction such that the temperature-conditioned air supplied from the cooling or heating device is introduced into the battery chamber 40. In the torrid zone, the battery temperature may become lower than a predetermined temperature on very few occasions, while in the frigid zone, the battery temperature may become higher than the predetermined temperature on very few occasions. In such an automobile, a satisfactory effect can be achieved at less cost.

Although the air conditioner 3 and the battery chamber 40 are interconnected by the air duct 44 in the above embodiment, it will be understood that the battery temperature control system can be constructed so that the air supplied from the air conditioner 3 into the compartment 2 and used to air-condition the latter may be permitted to flow also through the compartment 2 into the battery chamber 40.

Further, although the electric fans 42 and 43 in the battery chamber 40 are described as being driven only when the temperature-conditioned air is introduced from the air conditioner 3 into the battery chamber 40 in the above embodiment, it will be also understood that the battery temperature control system may be constructed so that the electric fans 42 and 43 are always driven during charging, in order to efficiently ventilate the interior of the battery chamber 40.

The charger C is not limited to a constant current type as described in the above embodiment, but rather a constant voltage type charger may be used.

In addition to the combustion heater as described in the above embodiment, an electric heater may be used as an auxiliary heater.

What is claimed is:

1. A battery temperature control system in an electric automobile equipped with an air-cooling device for supplying cool air into a passenger compartment, which automobile travels by using an electric motor as the driving force and a battery as an electric power source for the electric motor, comprising;

a battery chamber separate and isolated from the passenger compartment with the battery mounted in said battery chamber, a battery temperature sensor for detecting a temperature of said battery, a control unit for driving said air-cooling device when the battery temperature detected by said battery temperature sensor is higher than a predetermined temperature, and a temperature-conditioned air intake port provided in said battery chamber and connected through a duct to said air-cooling device for introducing cool air supplied from said air-cooling device directly into said battery chamber and separately from the passenger compartment.

2. A battery temperature control system in an electric automobile equipped with an air-heating device for supplying warm air into a passenger compartment, which automobile travels by using an electric motor as the driving force and a battery as an electric power source for the electric motor, comprising;

a battery chamber separate and isolated from the passenger compartment with the battery mounted in said battery chamber, a battery temperature sensor for detecting a temperature of said battery, a control unit for driving said air-heating device when the battery temperature detected by said battery temperature sensor is lower than a predetermined temperature, and a temperature-conditioned air intake port provided in said battery chamber and connected through a duct to said air-heating device for introducing warm air supplied from said air-heating device directly into said battery chamber and separately from the passenger compartment.

3. A battery temperature control system in an electric automobile equipped with an air conditioner for supplying cool or warm air into a passenger compartment, which automobile travels by using an electric motor as the driving force and a battery as an electric power source for the electric motor, comprising;

a battery chamber separate and isolated from the passenger compartment with the battery mounted in said battery chamber, a battery temperature sensor for detecting a temperature of said battery, a control unit for driving said air conditioner in an air-cooling mode when the battery temperature detected by said temperature sensor is higher than a predetermined upper limit, and in an air-heating mode when the battery temperature detected by said temperature sensor is lower than a predetermined lower limit, and a temperature-conditioned air intake port provided in said battery chamber and connected through a duct to said air conditioner for introducing an air supplied from said air conditioner directly into said battery chamber and separately from the passenger compartment.

4. A battery temperature control system in an electric automobile according to claim 3, further including an outside-air intake port provided in said battery chamber for admitting air present outside the vehicle into said battery chamber, said outside-air intake port and said temperature-conditioned air intake port being switchable by a damper, and wherein said control unit is designed to generate a damper switchover signal indicative of a command to switchover said damper for opening said outside-air intake port when said battery temperature is between said upper and lower limit temperatures.

5. A battery temperature control system in an electric automobile equipped with an air conditioner for supplying cool or warm air into a passenger compartment, which automobile travels by using a battery as a power source accommodated in a battery chamber, comprising;

a battery temperature sensor for detecting a temperature of said battery, a control unit for driving said air conditioner in an air-cooling mode when the battery temperature detected by said temperature sensor is higher than a predetermined upper limit, and in an air-heating mode when the battery temperature detected by said temperature sensor is lower than a predetermined lower limit, a temperature-conditioned air intake port provided in said battery chamber for introducing an air supplied from said air conditioner into said battery chamber, a charge judging means for judging whether said battery is being charged, and wherein said control unit is designed to generate a signal indicative of a command to increase an electric charging power of a charger for charging the battery when it is judged by the charge judging means that the battery is being charged and said air conditioner is driven.

6. A battery temperature control system in an electric automobile equipped with an air conditioner for supplying cool or warm air into a passenger compartment, which automobile travels by using an electric motor as the driving force and a battery as an electric power source for the electric motor, comprising;

a battery chamber separate and isolated from the passenger compartment with the battery mounted in said battery chamber, a battery temperature sensor for detecting a temperature of said battery, a control unit for driving said air conditioner in an air-cooling mode when the battery temperature detected by said temperature sensor is higher than a predetermined upper limit, and in an air-heating mode when the battery temperature detected by said temperature sensor is lower than a predetermined lower limit, a temperature-conditioned air intake port provided in said battery chamber for introducing an air supplied from said air conditioner directly into said battery chamber and separately from the passenger compartment, and wherein said air conditioner includes a heat pump type air conditioner, and said system further includes an auxiliary heater for heating the air supplied from said air conditioner when the temperature of the outside air is lower than a predetermined temperature.

7. A battery temperature control system in an electric automobile having an air conditioner for supplying cool or warm air into a passenger compartment and an electric motor as a motive force for the automobile and a battery as an electric power source for the electric motor, comprising;

a battery chamber separate and isolated from the passenger compartment with the battery mounted in said battery chamber, means for determining the temperature of said battery, and means for selectively supplying, directly to said battery chamber from said air conditioner and separately from the passenger compartment, cool air when the battery temperature is higher than a predetermined upper limit and warm air when the battery temperature is lower than a predetermined lower limit.

8. A battery temperature control system according to claim 7 further including means for selectively supplying outside air to said battery chamber when said battery temperature is between said upper and lower limit temperatures.

9. A battery temperature control system in an electric automobile having an air conditioner for supplying cool or warm air into a passenger compartment and a battery in a battery chamber as a power source for the automobile, comprising;

means for determining the temperature of said battery, means for selectively supplying to said battery chamber from said air conditioner cool air when the battery temperature is higher than a predetermined upper limit and warm air when the battery temperature is lower than a predetermined lower limit, means for determining when said battery is being charged, and means for causing an increase in an electric charging power of a charger or charging the battery when it is determined that the battery is being charged and said air conditioner is operated.

10. A battery temperature control system according to claim 9 wherein said air conditioner includes a heat pump type air conditioner, and said system further includes an auxiliary heater operable by other than the battery for heating the air supplied from said air conditioner when the temperature of the open air is lower than a predetermined temperature.

11. A battery temperature control system according to claim 9, wherein means are provided for determining when the passenger compartment requires cooling and heating and simultaneously providing either cool air or warm air to both the passenger compartment and the battery chamber when both require cool air or both require warm air.

12. A battery temperature control system according to claim 9, wherein presetting are provided for presetting a departure time for the automobile and causing operation of said air conditioner before said departure time for selectively cooling and heating the passenger compartment.

13. A battery temperature control system according to claim 12, wherein said presetting means includes means changing at least one of said predetermined limit temperatures for operating the air conditioner for cooling or heating the battery chamber within a predetermined time period at least one of either before or after said preset departure time.

14. A battery temperature control system in an electric automobile having an air conditioner for supplying cool or warm air into a passenger compartment and a battery in a battery chamber as a power source for the automobile, comprising;

means for determining the temperature of said battery, means for selectively supplying to said battery chamber from said air conditioner cool air when the battery temperature is higher than a predetermined upper limit and warm air when the battery temperature is lower than a predetermined lower limit, and wherein means are provided for detecting a value of at least one of ambient temperature of air outside the automobile, Hydrogen concentration in the battery chamber, carbon monoxide in air outside the automobile, electric current supplied by a charger during charging of the battery, voltage of the battery, electric current being used from the battery and connection of a charger to the battery, and selectively operating said air conditioner in response to each said detected value.

15. A battery temperature control system according to claim 7 or 8, wherein said air conditioner includes a heat pump type air conditioner, and said system further includes an auxiliary heater operable by other than the battery for heating the air supplied from said air conditioner when the temperature of the open air is lower than a predetermined temperature, 16. A battery temperature control system according to claim 7 or 8, wherein means are provided for determining when the passenger compartment requires cooling and heating and simultaneously providing either cool air or warm air to both the passenger compartment and the battery chamber when both require cool air or both require warm air.

17. A battery temperature control system according to claim 7 or 8, wherein means are provided for presetting a departure time for the automobile and causing operation of said air conditioner before said departure time for selectively cooling and heating the passenger compartment.

18. A battery temperature control system in an electric automobile having an air conditioner for supplying cool or warm air into a passenger compartment and a battery in a battery chamber as a power source for the automobile, comprising;

means for determining the temperature of said battery, and means for selectively supplying, directly to said battery chamber from said air conditioner, cool air when the battery temperature is higher than a predetermined upper limit and warm air when the battery temperature is lower than a predetermined lower limit, wherein means are provided for presetting a departure time for the automobile and causing operation of said air conditioner before said departure time for selectively cooling and heating the passenger compartment, and wherein said means for presetting a departure time includes means changing at least one of said predetermined limit temperatures for operating the air conditioner for cooling or heating the battery chamber within a predetermined time period at least one of either before or after said preset departure time.

19. A battery temperature control system in an electric automobile equipped with an air-cooling device for supplying cool air into a passenger compartment which automobile travels by using a battery as a power source accommodated in a battery chamber, comprising;

a battery temperature sensor for detecting a temperature of said battery, a control unit for driving said air-cooling device when the battery temperature detected by said battery temperature sensor is higher than a predetermined temperature, and a temperature-conditioned air intake port provided in said battery chamber and connected through a duct to said air-cooling device for introducing cool air supplied from said air-cooling device directly into said battery chamber, wherein means are provided for detecting a value of at least one of ambient temperature of air outside the automobile, Hydrogen concentration in the battery chamber, carbon monoxide in air outside the automobile, electric current supplied by a charger during charging of the battery, voltage of the battery, electric current being used from the battery and connection of a charger to the battery, and selectively operating said air conditioner in response to each said detected value.

20. A battery temperature control system in an electric automobile having an air conditioner for supplying cool or warm air into a passenger compartment, which automobile travels by using an electric motor as the motive force and a battery as an electric power source for the electric motor, comprising;

a battery chamber separate and isolated from the passenger compartment with the battery mounted in said battery chamber, a battery temperature sensor for detecting a temperature of said battery, a control unit for driving said air conditioner in an air-cooling mode when the battery temperature detected by said temperature sensor is higher than a predetermined upper limit, and in an air-heating mode when the battery temperature detected by said temperature sensor is lower than a predetermined lower limit, a temperature-conditioned air intake port provided in said battery chamber and connected through a duct to said air conditioner for introducing an air supplied from said air conditioner directly into said battery chamber and separately from the passenger compartment, and wherein means are provided for determining when the passenger compartment requires cooling and heating and simultaneously providing either cool air or warm air to both the passenger compartment and the battery chamber when both require cool air or both require warm air.

21. A battery temperature control system in an electric automobile having an air conditioner for supplying cool or warm air into a passenger compartment, which automobile travels by using an electric motor as the motive force and a battery as an electric power source for the electric motor, comprising;

a battery chamber separate and isolated from the passenger compartment with the battery mounted in said battery chamber, a battery temperature sensor for detecting a temperature of said battery, a control unit for driving said air conditioner in an air-cooling mode when the battery temperature detected by said temperature sensor is higher than a predetermined upper limit, and in an air-heating mode when the battery temperature detected by said temperature sensor is lower than a predetermined lower limit, a temperature-conditioned air intake port provided in said battery chamber and connected through a duct to the air conditioner for introducing an air supplied from said air conditioner directly into said battery chamber and separately from the passenger compartment, and wherein presetting means are provided for presetting a departure time for the automobile and causing operation of said air conditioner before said departure time for selectively cooling and heating the passenger compartment.

22. A battery temperature control system in an electric automobile equipped with an air conditioner for supplying cool or warm air into a passenger compartment, which automobile travels by using a battery as a power source accommodated in a battery chamber, comprising;

a battery temperature sensor for detecting a temperature of said battery, a control unit for driving said air conditioner in an air-cooling mode when the battery temperature detected by said temperature sensor is higher than a predetermined upper limit, and in an air-heating mode when the battery temperature detected by said temperature sensor is lower than a predetermined lower limit, a temperature-conditioned air intake port provided in said battery chamber for introducing an air supplied from said air conditioner into said battery chamber, wherein presetting means are provided for presetting a departure time for the automobile and causing operation of said air conditioner before said departure time for selectively cooling and heating the passenger compartment, and wherein said presetting means includes means changing at least one of said predetermined limit temperatures for operating the air conditioner for cooling or heating the battery chamber within a predetermined time period at least one of either before or after said preset departure time.

23. A battery temperature control system in an electric automobile equipped with an air-heating device for supplying warm air into a passenger compartment, which automobile travels by using a battery as a power source accommodated in a battery chamber, comprising;

a battery temperature sensor for detecting a temperature of said battery, a control unit for driving said air-heating device when the battery temperature detected by said battery temperature sensor is lower than a predetermined temperature, and a temperature-conditioned air intake port provided in said battery chamber and connected through a duct to said air-heating device for introducing warm air supplied from said air-heating device directly into said battery chamber, wherein means are provided for detecting a value of at least one of ambient temperature of air outside the automobile, Hydrogen concentration in the battery chamber, carbon monoxide in air outside the automobile, electric current supplied by a charger during charging of the battery, voltage of the battery, electric current being used from the battery and connection of a charger to the battery, and selectively operating said air conditioner in response to each said detected value.

24. A battery temperature control system in an electric automobile equipped with an air conditioner for supplying cool or warm air into a passenger compartment which automobile travels by using a battery as a power source accommodated in a battery chamber, comprising;

a battery temperature sensor for detecting a temperature of said battery, a control unit for driving said air conditioner in an air-cooling mode when the battery temperature detected by said temperature sensor is higher than a predetermined upper limit, and in an air-heating mode when the battery temperature detected by said temperature sensor is lower than a predetermined lower limit, and a temperature-conditioned air intake port provided in said battery chamber and connected through a duct to said air conditioner for introducing an air supplied from said air conditioner directly into said battery chamber, wherein means are provided for detecting a value of at least one of ambient temperature of air outside the automobile, Hydrogen concentration in the battery chamber, carbon monoxide in air outside the automobile, electric current supplied by a charger during charging of the battery, voltage of the battery, electric current being used from the battery and connection of a charger to the battery, and selectively operating said air conditioner in response to each said detected value.

25. A battery temperature control system according to claim 18 further including means for selectively supplying outside air to said battery chamber when said battery temperature is between said upper and lower limit temperatures.

* * * * *